(12) United States Patent
Deros

(10) Patent No.: US 11,302,320 B2
(45) Date of Patent: Apr. 12, 2022

(54) SYSTEMS AND METHODS FOR DISABLING VOICE ASSISTANT AUDIO MONITORING AND DATA CAPTURE FOR SMART SPEAKERS AND SMART SYSTEMS

(71) Applicant: ATOM, Inc., Scottsdale, AZ (US)

(72) Inventor: Yani Deros, Scottsdale, AZ (US)

(*) Notice: Subject to any disclaimer, the term of this patent is extended or adjusted under 35 U.S.C. 154(b) by 0 days.

(21) Appl. No.: 16/600,747

(22) Filed: Oct. 14, 2019

(65) Prior Publication Data
US 2020/0395011 A1 Dec. 17, 2020

Related U.S. Application Data

(63) Continuation-in-part of application No. 16/443,797, filed on Jun. 17, 2019.

(51) Int. Cl.
| | | |
|---|---|---|
| G10L 15/22 | (2006.01) | |
| G06F 3/16 | (2006.01) | |
| G06F 3/04883 | (2022.01) | |
| H04L 67/125 | (2022.01) | |
| G06F 3/01 | (2006.01) | |
| H04R 3/00 | (2006.01) | |

(52) U.S. Cl.
CPC ............ G10L 15/22 (2013.01); G06F 3/016 (2013.01); G06F 3/04883 (2013.01); G06F 3/167 (2013.01); H04L 67/125 (2013.01); H04R 3/00 (2013.01); G10L 2015/223 (2013.01)

(58) Field of Classification Search
CPC ... G10L 15/22; G10L 2015/223; G06F 3/016; G06F 3/04883; G06F 3/167; H04L 67/125; H04R 3/00
See application file for complete search history.

(56) References Cited

U.S. PATENT DOCUMENTS

| | | |
|---|---|---|
| 6,121,695 A | 9/2000 | Loh |
| 6,447,357 B1 | 9/2002 | Pearl |
| 8,549,658 B2 | 10/2013 | Kolavennu |
| 9,060,197 B2 | 6/2015 | Warrick |
| 9,080,782 B1 | 7/2015 | Sheikh |
| 10,284,695 B1* | 5/2019 | Gejji ..................... G06F 1/1656 |
| 10,360,876 B1* | 7/2019 | Rahman ................. G06F 3/017 |
| 10,462,545 B2 | 10/2019 | Rao et al. |
| 10,930,276 B2 | 2/2021 | Hatambeiki |

(Continued)

OTHER PUBLICATIONS

International Search Report, PCT/US18/40107 dated Sep. 24, 2018; 4pgs.
Written Opinion, PCT/US18/40107 dated Sep. 24, 2018; 5pgs.

*Primary Examiner* — Abul K Azad

(57) ABSTRACT

A hotel room internet-of-things (IOT) controller includes: a housing configured for table-top mounting; a system controller operable by a hotel guest to wirelessly control environmental parameters in the hotel room using voice commands; a touch interactive screen extending above the housing; a voice capture circuit; and a switch disposed proximate an outside surface of the housing and manually operable between: i) a first position in which the voice capture circuit is connected to the system controller; ii) a second position in which the voice capture circuit is disconnected from the system controller; and iii) an additional step and secondary method to confirm through a double opt-in or opt-out through a user interface on the device or mobile device connected to the system.

19 Claims, 34 Drawing Sheets

(56) References Cited

U.S. PATENT DOCUMENTS

| | | |
|---|---|---|
| 10,930,455 B2 | 2/2021 | Fehl et al. |
| 2002/0089820 A1 | 7/2002 | Abboud |
| 2003/0007321 A1 | 1/2003 | Dayley |
| 2007/0072474 A1 | 3/2007 | Beasley |
| 2007/0079042 A1 | 4/2007 | Crosswy |
| 2007/0190509 A1* | 8/2007 | Kim .................. A46B 15/0002 434/263 |
| 2012/0172027 A1 | 7/2012 | Partheesh |
| 2015/0130270 A1 | 5/2015 | Peto |
| 2016/0241999 A1* | 8/2016 | Chin ...................... G08C 23/04 |
| 2016/0374413 A1 | 12/2016 | Kweon |
| 2018/0308470 A1* | 10/2018 | Park ...................... G10L 15/063 |
| 2018/0308482 A1* | 10/2018 | Ro .......................... G06F 3/167 |
| 2020/0196141 A1* | 6/2020 | Baker ................... H04W 12/02 |
| 2021/0011518 A1 | 1/2021 | Qin et al. |

* cited by examiner

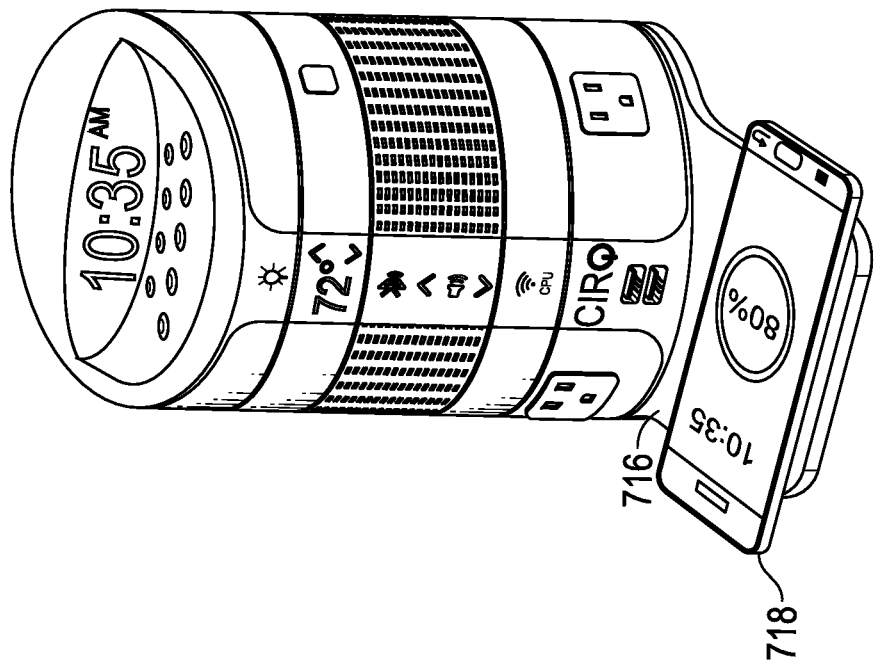
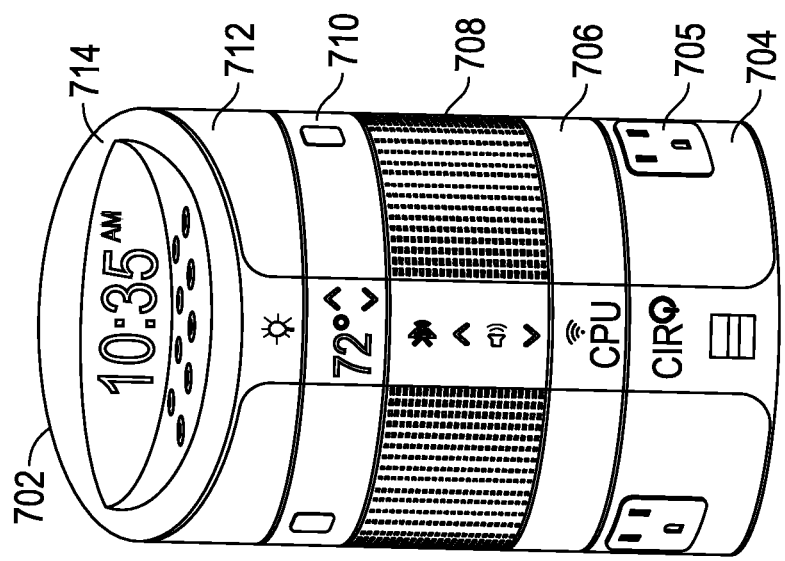
FIG. 7

FIG. 27      2702

SYSTEMS AND METHODS FOR DISABLING VOICE ASSISTANT AUDIO MONITORING AND DATA CAPTURE FOR SMART SPEAKERS AND SMART SYSTEMS

CROSS-REFERENCE TO RELATED APPLICATIONS

This is a continuation-in-part application claiming priority to U.S. patent application Ser. No. 16/443,797, filed Jun. 17, 2019 the entirety of which is hereby incorporated herein by this reference.

FIELD OF THE INVENTION

The present invention relates, generally, to an interactive electronic device that utilizes Artificial Intelligence via audio monitoring, processing, and recording features and, more particularly, to methods and apparatus unambiguously disabling voice capture.

BACKGROUND

Presently known methods used by hotel guests to obtain information on property amenities, guest/room services, travel and entertainment schedules generally involve i) dialing the hotel operator or concierge; and ii) using the TV remote to navigate information displayed on an in-room television screen or reviewing printed materials in the room. As social media replaces traditional tools, the hospitality industry seeks new and improved methods for interacting with and enhancing the guest experience.

Smart speakers, smart displays, mobile telephones, and related software applications allow users to instantly access and retrieve real time information on any number of topics, and to otherwise interact with and control their environment. For example, the Echo™ smart speaker developed by Amazon connects users to the voice-controlled intelligent personal assistant service Alexa™. The features of the device include: voice interaction, music playback, making to-do lists, setting alarms, streaming podcasts, and playing audiobooks, in addition to providing weather, traffic and other real-time information. It can also control several smart devices, acting as a home automation hub.

Similarly, Google Home™ smart speakers enable users to use voice commands to interact with Google Assistant™ to listen to music, control playback of videos or photos, or receive news updates. Google Home devices also support home automation, allowing users control smart home appliances with their voice. in 2017 Google introduced multi-user support (allowing the device to distinguish between six different voices), hands-free phone calling in the United States and Canada, visual responses on mobile devices or Chromecast™-enabled televisions, Bluetooth audio streaming, and calendar reminders and appointments.

In 2018 Facebook introduced their Portal™ brand of smart displays (screen-enhanced smart speakers). The devices offer video chat via Facebook Messenger™, augmented by a smart-camera which can auto-zoom and follow people as they move around. The devices are integrated with Amazon's voice-controlled intelligent personal assistant service Alexa.

Despite broad consumer acceptance of smart speakers, smart displays, camera-equipped televisions and computer monitors, and mobile apps for controlling internet-of-things (IOT) devices, significant data privacy concerns remain. Indeed, many consumers are unwilling to use these smart devices due personal privacy concerns especially when staying in a hotel room.

Devices, systems, and methods are thus needed which overcome these and other limitations of the prior art.

BRIEF SUMMARY

The present invention provides devices and methods which overcome the foregoing limitations without compromising the rich feature sets to which consumers have become accustomed. In various embodiments, the microphone, speech capture module, voice processor, Artificial Intelligence processor, and/or voice processing executable code may be manually and/or mechanically disconnected from the motherboard or otherwise physically de-coupled or unplugged from the system, thereby providing the user with unambiguous visual confirmation that the voice capture functionality is disabled. This allows the user to opt in or opt out of the voice capture function on the user's terms, rather than having the opt in/opt out protocols dictated by the technology. The user may selectively re-connect the voice capture, voice processing, and/or AI processing components as and when desired.

To further enhance and protect privacy and security, multi-factor methods can be deployed to confirm a user's decision to activate or disable voice capture functionality; that is, mechanically enabling/disabling may be reinforced by one or more additional notifications such as a display notification on the native device itself, and/or a notification on a mobile device display, text message, or the like.

One embodiment involves an in-room, interactive control module used by guests to control their immediate environment and otherwise interact with hotel resources, staff, and the outside World using voice commands. The microphone, voice processor, and/or AI processor may be placed on a separate or otherwise independent circuit board and selectively connected to and mechanically disconnected or otherwise isolated from the rest of the system. A button, switch, toggle, rotatable dial, slide mechanism, pin connection, or other mechanical/electrical and/or data interface may be selectively moved from a first position (enabling or opting into a voice capture state) to a second position (disabling or opting out of a voice capture state), while providing visual, tactile, haptic, and/or aural confirmation of the selected state of the voice capture feature. These same features may be employed outside the context of hotel rooms, such as residential, commercial, industrial, academic, governmental, and business contexts.

In this way, the consumer does not have to "trust" manufacturer representations regarding the on/off state of the voice recording function; rather, the consumer can personally verify in real time that the microelectronics responsible for implementing the voice monitoring, capture, and/or processing functions are either connected (opt-in enabled) or disconnected (opt-in disabled or opt-out mode). In addition, this subjective verification by the user eliminates the ambiguity otherwise associated with a purely electronic mute button, inasmuch as the system may still be "listening" for an awaken word or un-mute command.

Although the present invention is described in the context of a manually connectable microphone and/or voice processor, the selective engagement feature may be used in conjunction with other applications (or combinations thereof) including virtually any type of sensor (e.g., thermal, motion, biometric, velocity, acceleration, light intensity, frequency, presence, camera, facial recognition, natural language processors, antennas, wireless protocols, Cloud controls, backend interface and systems) or any other desired application, function, process, algorithm, or feature. By way of non-limiting example, a smart device may be configured such that the microphone defaults to the unplugged (or opt-out) condition. The user may press or articulate a button or otherwise mechanically toggle the microphone into a connected position to enable recording (e.g., using single or multi-factor authentication).

Alternatively, the device may be configured to commence recording (or other function) in response to one or more sensed and/or manual inputs, such as the presence of a predetermined number of people (e.g., none, only one, only two, more than two, or the like). In yet a further alternative, the manually configurable toggle may be replaced or augmented by a motorized or spring loaded switch, such that the voice recorder/processor or other sensor remains unplugged until a predetermined condition is detected, such as the presence of a particular person. In this embodiment, a supplemental microphone may be used to detect voice profiles, and a primary microphone used to capture voice data once predetermined conditions are satisfied using the supplemental microphone.

There is also a need for a Platform as a Service (PaaS) solution combined with (or including) an in-room IOT control system which may be controlled by a loyalty mobile app, in-room connected devices or service campaign, and which tracks guest location, interests, feedback and needs to thereby enable customized guest experiences and targeted marketing programs informed by contextual awareness, such as whether the guest is travelling for business or pleasure as well as personal preferences that can be migrated from property to property. Furthermore, the integrated display and multi-modal interface that includes touch screen, display and voice controls can be hosted locally or remotely without the need for the guest to download a mobile app.

To achieve the foregoing and other objectives in accordance with the present invention as broadly described herein, various embodiments comprise: i) a hotel-wide or enterprise-wide PaaS system; ii) a room based IOT network including a base module configured to control a plurality of peripheral network devices (e.g., lights, television, router, radio, telephone, shades, door locks, water, thermostat) or embedded building infrastructure sensor solution; iii) a mobile app which is separately downloadable on a guest mobile device or embedded within an existing hotel brand app running on the guest's mobile device, the app configured to interface with and control the IOT network and coordinate hotel services; iv) a location tracking service managed by the app and configured to monitor the location of the guest on and/or off the hotel property; and v) an analytics and/or machine learning engine configured to augment the location data with contextual awareness, to thereby facilitate enhanced customization of the guest experience and transmit targeted marketing messages to the guest (e.g., in real time) to generate additional revenue channels for the property; vii) configuring the PaaS system to deliver an Application Program Interface (API) allowing the hotel property manager to monitor and control the IOT devices to reduce power and water usage within each hotel room independently or within a select property space conveniently and effectively to yield additional cost savings for utilities throughout the facility; viii) wirelessly controlling room temperature through a controller positioned within a bedside module; ix) thermal mapping and other motion mapping using multiple sensors (including but not limited to Radar) within a guest room; x) radar or other sensor modalities may be provided to sense respiratory breathing and rhythms of sleeping of resting guests; xi) promoting conservation through gamification coupled with a loyalty rewards component; xii) migration of guest personal preferences that can move from property to property; xiii) configuring the API to offer hotel managers the ability to set thresholds or limits to thereby track and manage utility usage within each hotel room and other areas on the property; and xiv) selectively decoupling the microphone from the system controller to prevent inadvertent or undesired recording, and providing visual and/or audio confirmation to the user that recording is disabled as part of the Opt-Out protocol.

In an embodiment, the IOT control system comprises a base unit adapted for electrical communication with a high voltage power source, and a plurality of stacked electronic modules adapted for wirelessly receiving communications from the base including high voltage power, low voltage DC power, data, and control signals.

Each stacked electronic module may be configured to communicate with, monitor, embody, interface with and/or control one or more of the following IOT devices: computing and communication devices for facilitating hotel services such as room service and concierge services, electronic card readers, hard drives, lamps, batteries, speakers, clocks, fans, pencil sharpeners, cup holders, staplers, mug warmers, stock tickers, displays, personal computers, electric staplers, tape dispensers, pencil holders, game controllers, wireless chargers, post-it note dispensers, coffee makers, refrigerators, web cameras, wireless receivers, wireless transmitters, Blue ray/CVD/CD/disk drives, baby monitors, air fresheners, mobile device stands, air ionizers, credit card transaction terminals, loyalty card rewards card interface, motion sensors, power interfaces, laptop and smart phone docking and charging stations, home controls, game controllers, thermostats, fire alarm/smoke/CO detectors, gestural interfaces, numeric/calculator pads, scanners, eye tracking devices, flash drives, wireless pads/styluses wireless mouses, wireless keyboards, wireless charging stations, web cameras, wireless receivers, wireless transmitters, battery power sources, IO panel/instrument jack, spare plug outlets (similar to a power strip), wireless headphone transmitters, auxiliary interfaced or wireless screens/displays, credit/debit card chip and magnetic stripe readers, HVAC systems, displays, personal computers, shade, blind, and other window covering controllers, door and window locks, faucets, showers, toilets, sinks, water leak detectors, and combinations thereof.

In the context of this disclosure, the terms hotel and property may also contemplate motels, apartment complexes, timeshares, cruise ships, room sharing services or any other type of property management or residence installations.

By way of non-limiting example, contextual awareness may include "knowing" that the guest is primarily or currently attending to business or pleasure, the guest's short term and/or long term itinerary, the guest's previous locations (conference room, restaurant, office building, movie theater), and unique user preferences relating to cuisine, entertainment, lifestyle, music, and environmental comfort metrics such as lighting, room temperature, mattress firmness, and the like. Additional contextual awareness metrics may include monitoring when location data goes dark, and thereafter re-emerges in another city, suggesting that the guest has flown from one city to another.

Additionally the PaaS system may be configured to learn guest habits, routines and preferences for processing analytics to intelligently (e.g., algorithmically) prepare the hotel room to accommodate desired environmental factors including temperature, lighting, window shade position, entertainment, and consumable items such as beverages and food that would deliver an inviting and welcoming room presence to drive loyalty for the property and brand.

BRIEF DESCRIPTION OF THE DRAWING FIGURES

These and other features, aspects, and advantages of the present invention will become better understood with reference to the following description, appended claims, and accompanying drawings, where:

FIG. 7 is a more detailed view of the base module in accordance with various embodiments;

Figure 30:
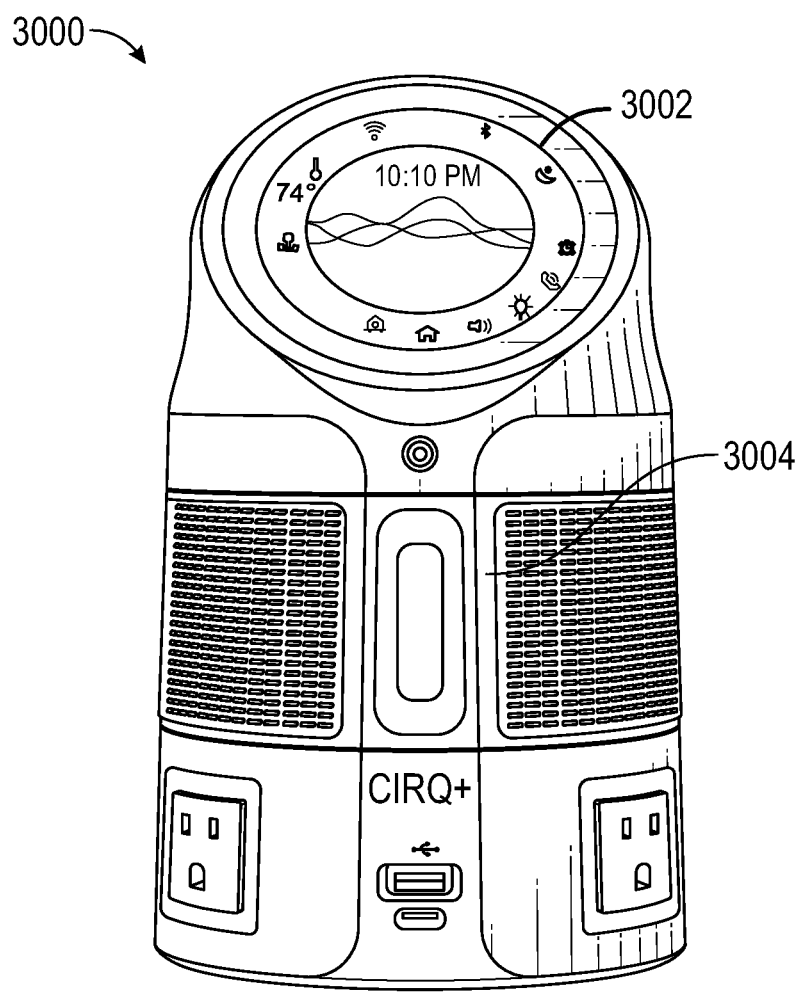
FIG. 30 is a front elevation view of an exemplary base module showing a manually disconnectable microphone and/or voice processing circuit in accordance with various embodiments.
Figure 31:
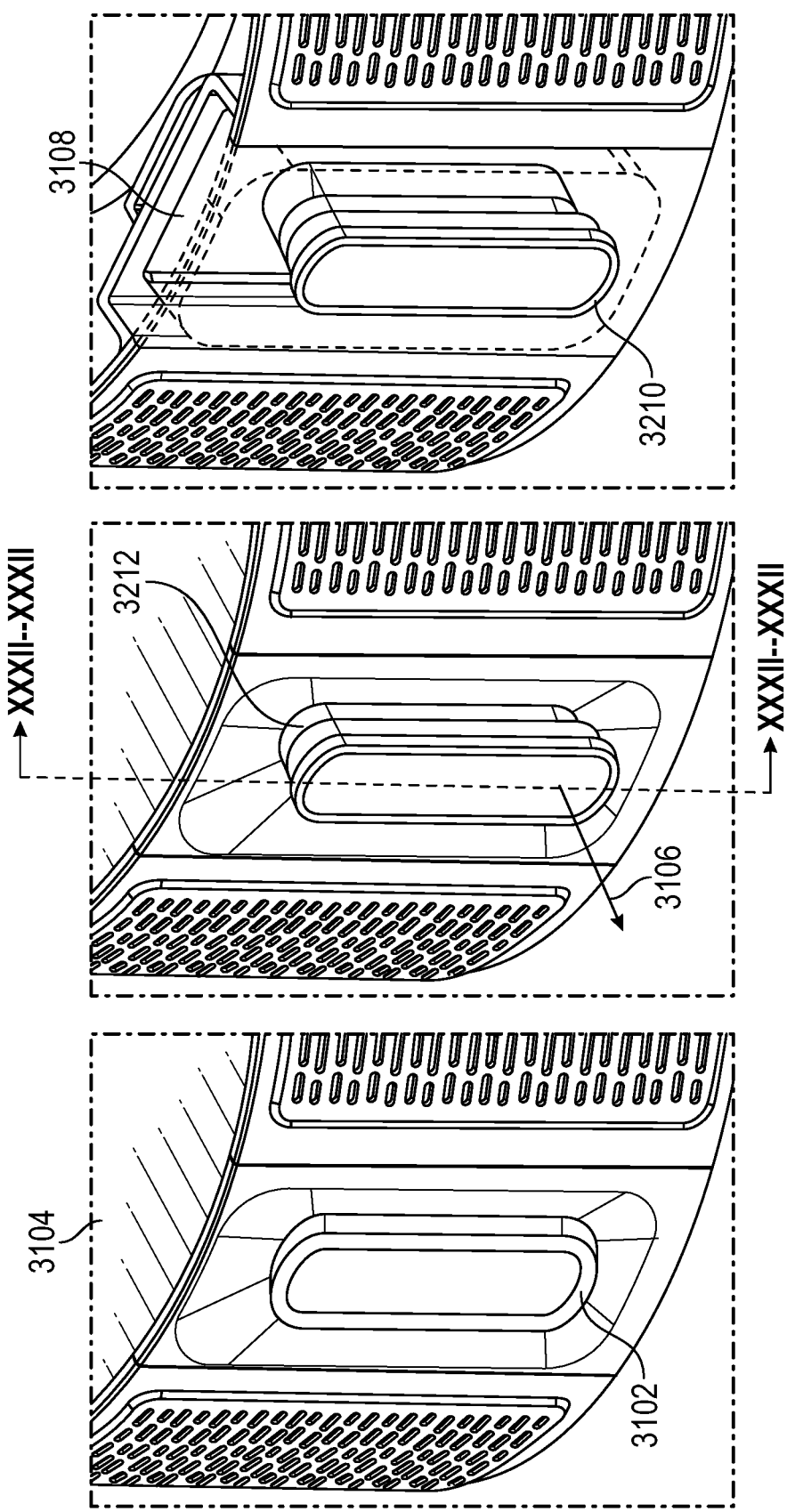
Figure 32:
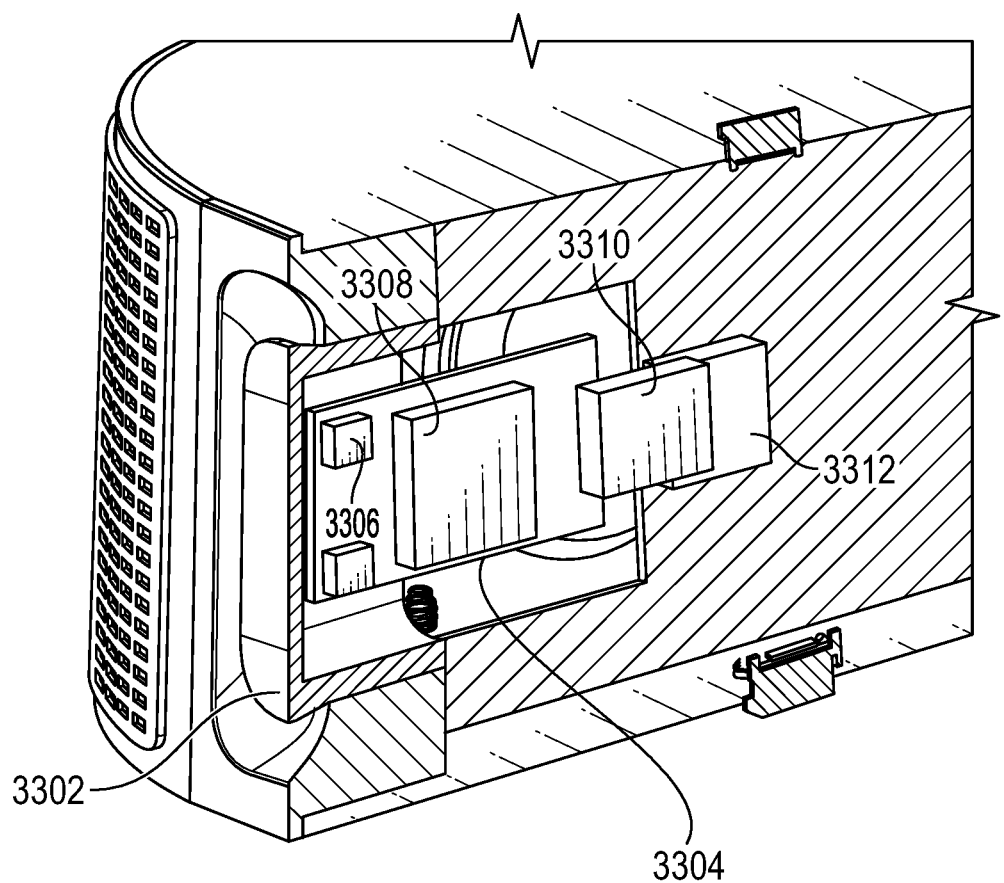
Figure 33A:
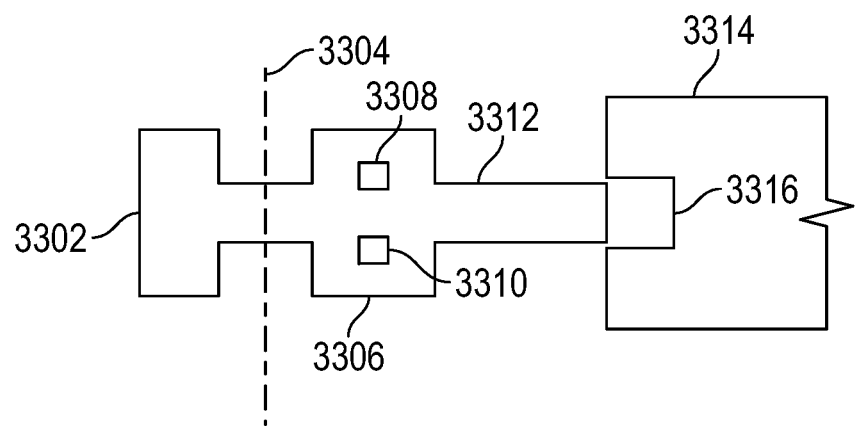
Figure 33B:
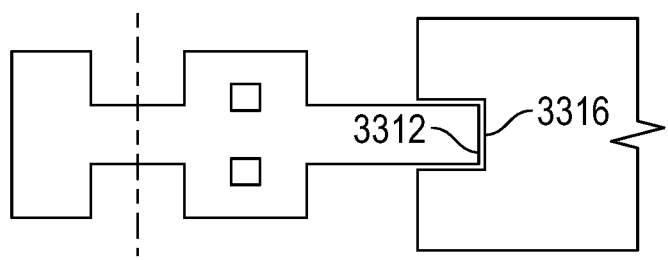
Figure 34:
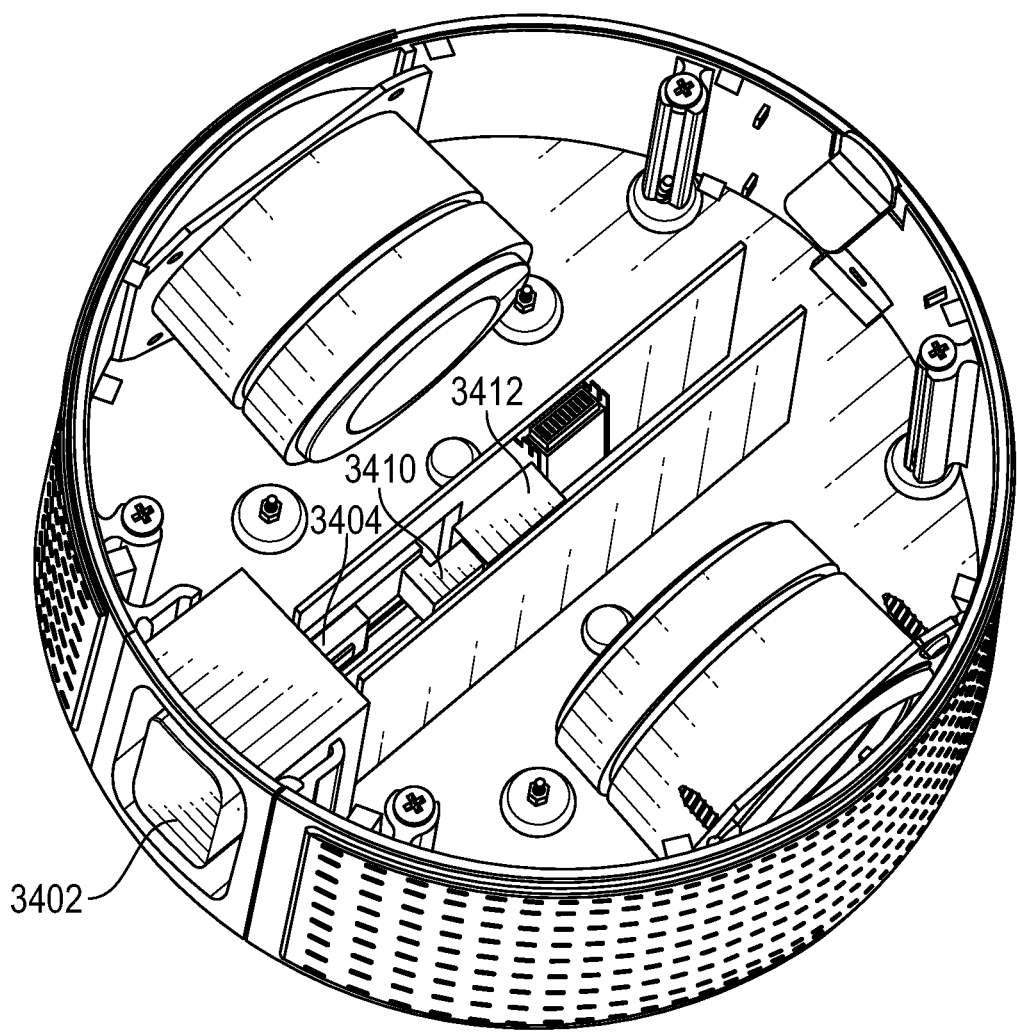
Figure 35:
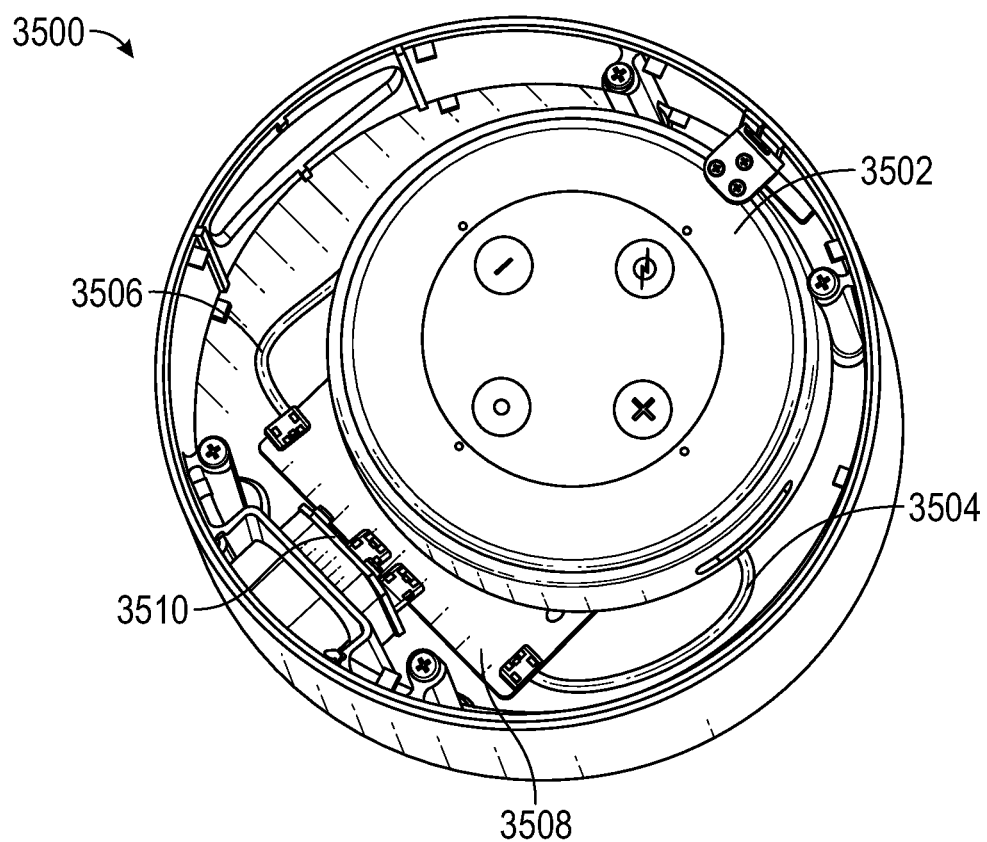

FIGS. 31A-C are detailed views of the manual disconnect elements of FIG. 30 shown in the voice active opt-in (FIG. 31A) and voice unplugged opt-out (FIGS. 31B, C) positions in accordance with various embodiments;

FIG. 32 is a schematic cut-away view taken along line XXXII-XXXII of FIG. 31B, illustrating the voice circuit selectively engagable with the system processor via a movable mechanical power/data connector in accordance with various embodiments;

FIG. 33A is a schematic view of an audio circuit mounted to a movable mechanical selector shown disengaged from the system processor in accordance with various embodiments;

FIG. 33B is a schematic view of the audio circuit of FIG. 33A shown engaged with (connected to) the system processor in accordance with various embodiments;

FIG. 34 is a top perspective schematic view of the connection assembly of FIG. 32 in accordance with various embodiments; and FIG. 35 is a schematic view of an alternate embodiment of a disconnectable commercial voice capture system such as an Amazon Echo Dot or other similar compact voice assistance devices in accordance with various embodiments.

DETAILED DESCRIPTION OF PREFERRED EXEMPLARY EMBODIMENTS

Various embodiments disclose a sensor (e.g., a microphone) disposed on a first circuit board, a system controller disposed on a second circuit board, and a mechanical motion that creates a switch configured to selectively connect and disconnect the first and second circuit boards to avoid undesired recording and thereby protect personal data and enhance privacy.

Referring first to FIGS. 17-29, the manner in which various personality traits may be imparted to the display will now be described, followed by a description of the subject matter of FIGS. 1-16.

Figure 16:
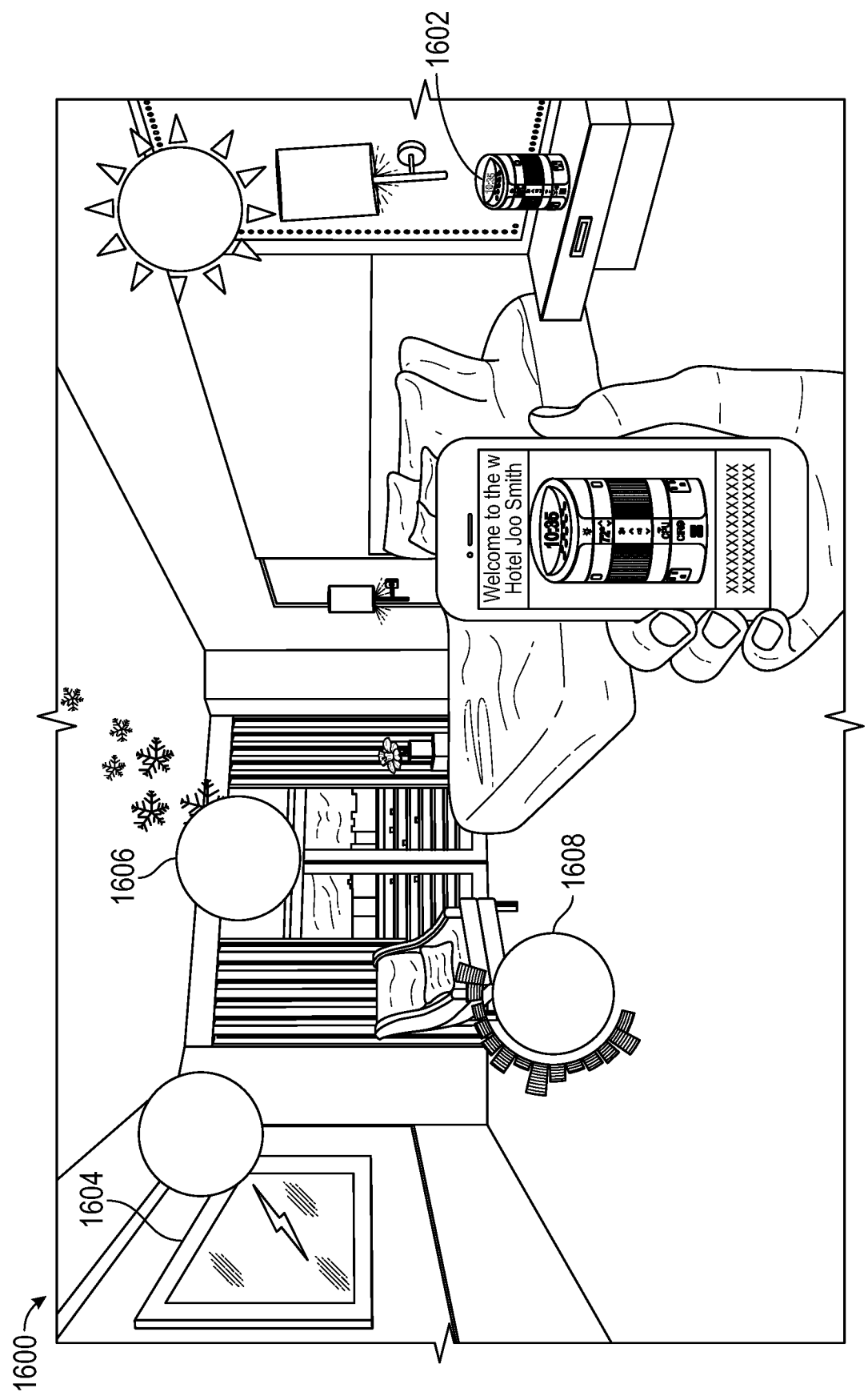
FIG. 16 is a schematic diagram of an in-room IOT module wirelessly coupled to a plurality of distributed sensors for monitoring motion and thermal zones in accordance with various embodiments.
Figure 17:
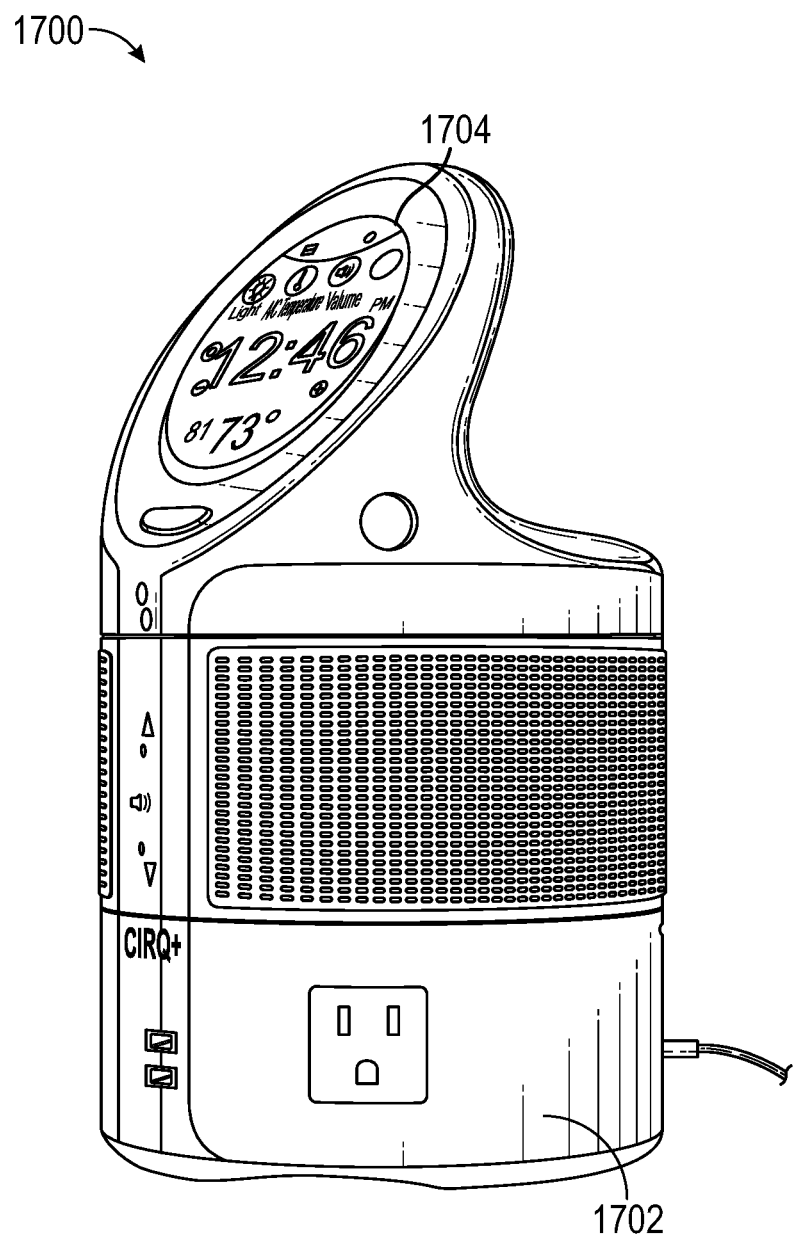
FIG. 17 is an exemplary view of a control module having a rounded display screen extending from the top of a cylindrical body in accordance with various embodiments.

FIG. 17 is a control module 1700 having a rounded display screen 1704 extending from the top of a cylindrical body 1702. In the illustrated embodiment, the body 1702 is configured to be placed on a table, counter-top, desk, night stand, or the like. The various features and functions of the module not related to the anthropomorphic display screen are discussed in detail below in conjunction with FIGS. 1-16.

Figure 18:
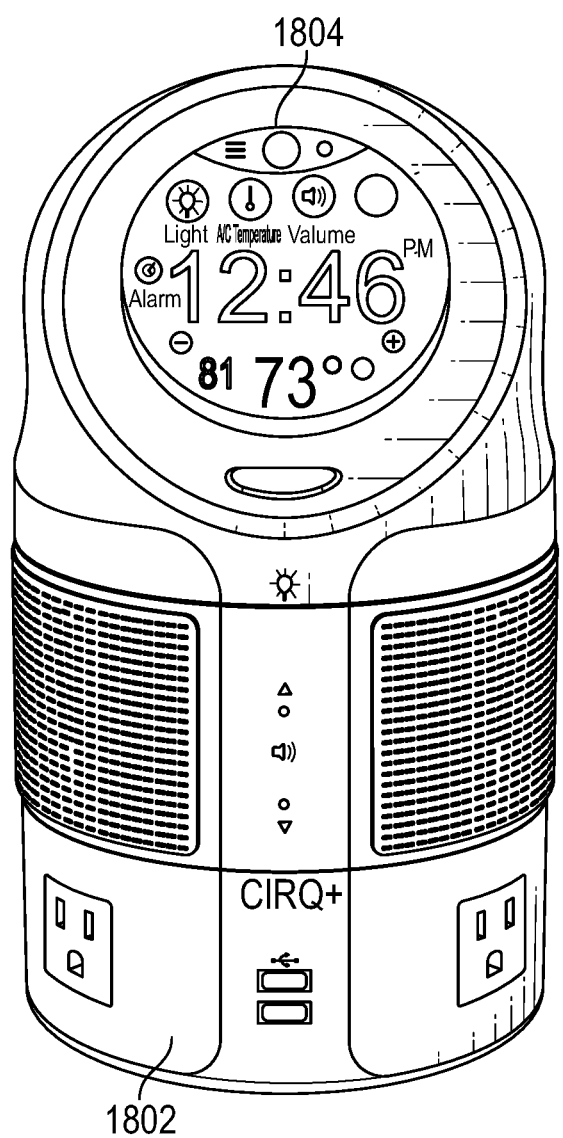
FIG. 18 is a front view of the control module of FIG. 17, illustrating a "face-to-face" view of the display screen in accordance with various embodiments.

FIG. 18 is a front view of an exemplary control module including a display screen 1804 extending from a body 1802.

Figure 19:
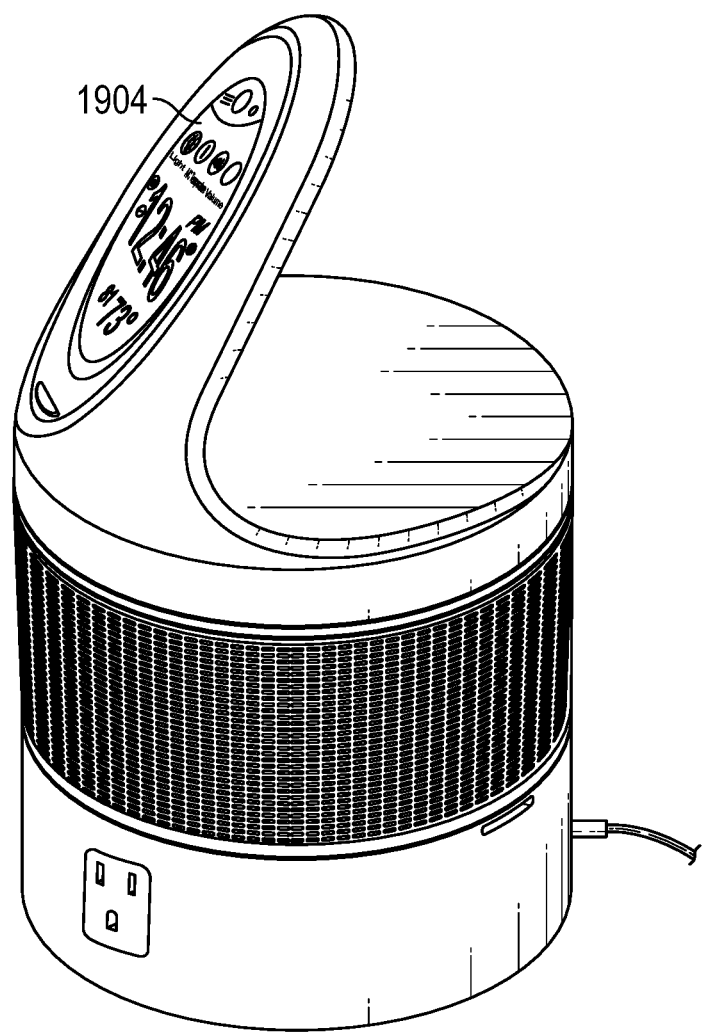
FIG. 19 is a top perspective view of the module of FIG. 17 in accordance with various embodiments.

FIG. 19 shows a display 1904 tilted with respect to the vertical axis of the body.

Figure 20:
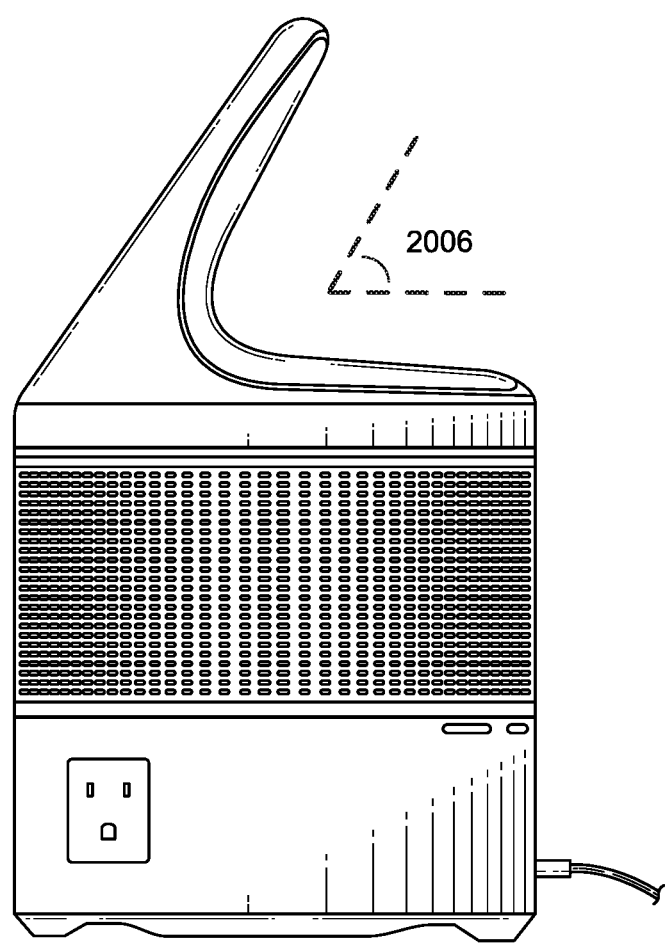
FIG. 20 is a side elevation view of the module shown in FIG. 17 in accordance with various embodiments.

FIG. 20 is a side elevation view of a control module showing the display tilted at an angle 2006 relative to a horizontal plane. Various embodiments contemplate a static or adjustable angle 2006 in the range of 30 to 90 degrees, and preferably about 45 to 60 degrees, and most preferably about 56 degrees.

Figure 21:
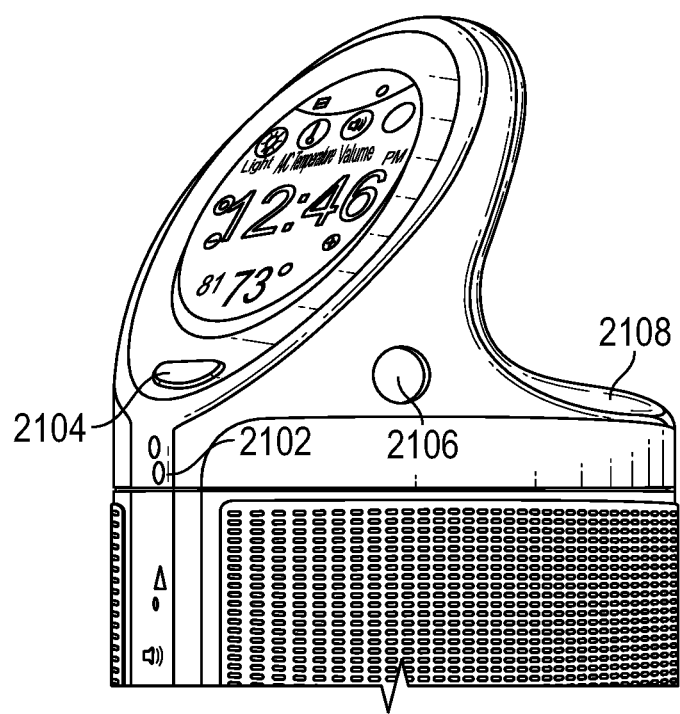
FIG. 21 is a detailed view of the display of FIG. 17, depicting various control features in accordance with various embodiments.

FIG. 21 is a control module 2100 depicting various control features including: a brightness adjustment 2102; a snooze button 2104; one or more occupancy, presence, or motion sensors 2106; and a lamp 2108.

Figure 22:
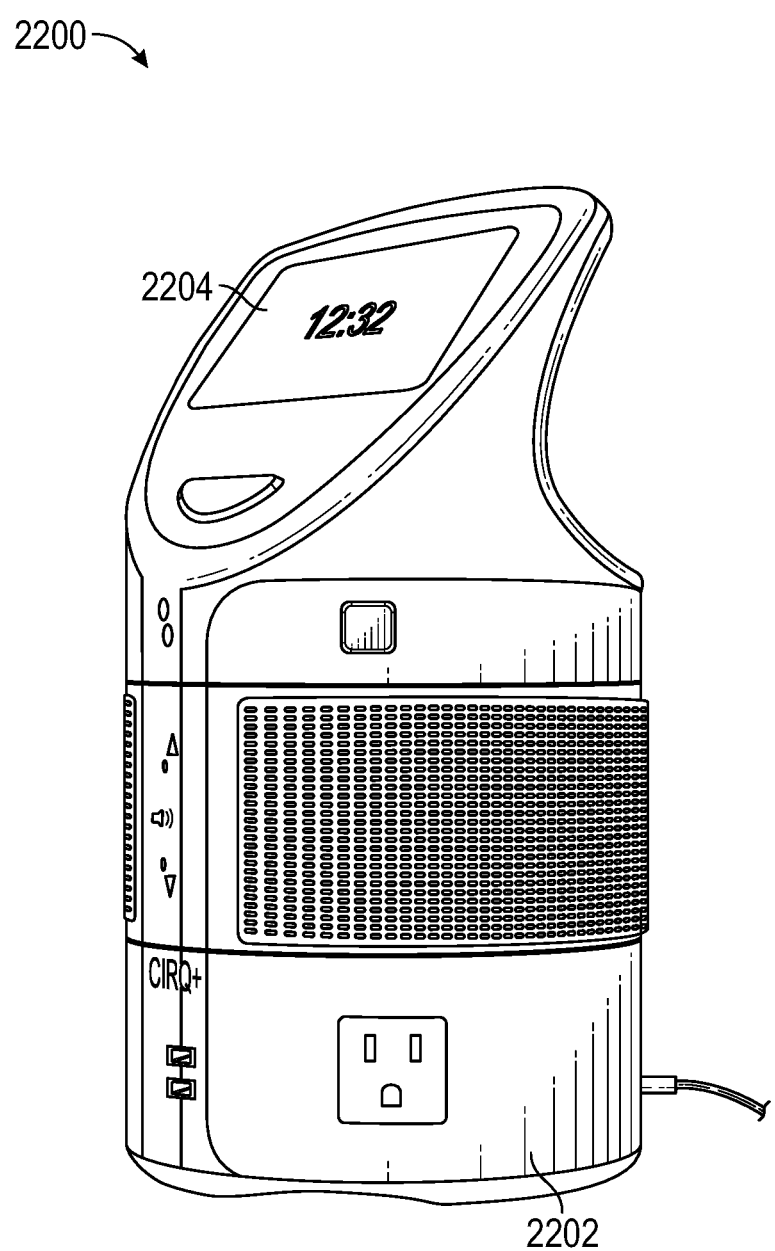
FIG. 22 is an alternate embodiment of a non-circular display screen in accordance with various embodiments.

FIG. 22 is an alternate embodiment of a control module including a base unit 2202 supporting a non-circular display screen 2204.

Figure 23:
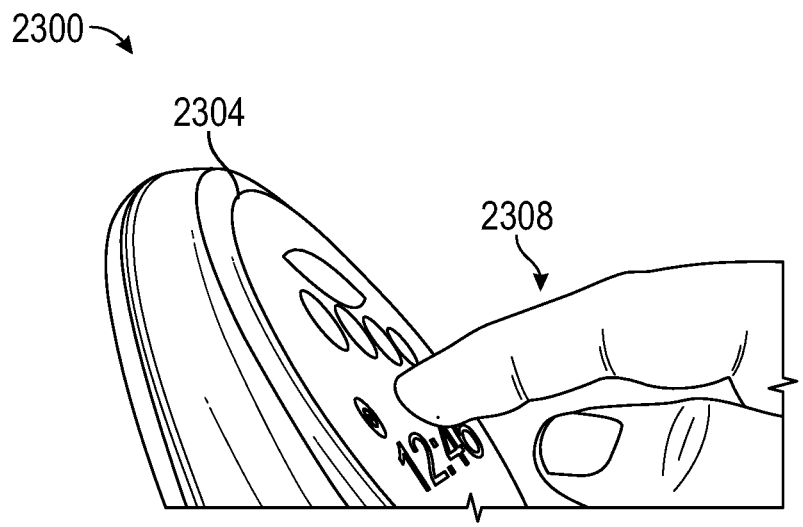
FIG. 23 is a detailed view of the display screen illustrating touch interaction with a hotel guest in accordance with various embodiments.

FIG. 23 is a close-up view of a touch interaction event 2300 involving a user (e.g., hotel guest) 2308 inputting a selection onto a display screen 2304.

Figure 24:
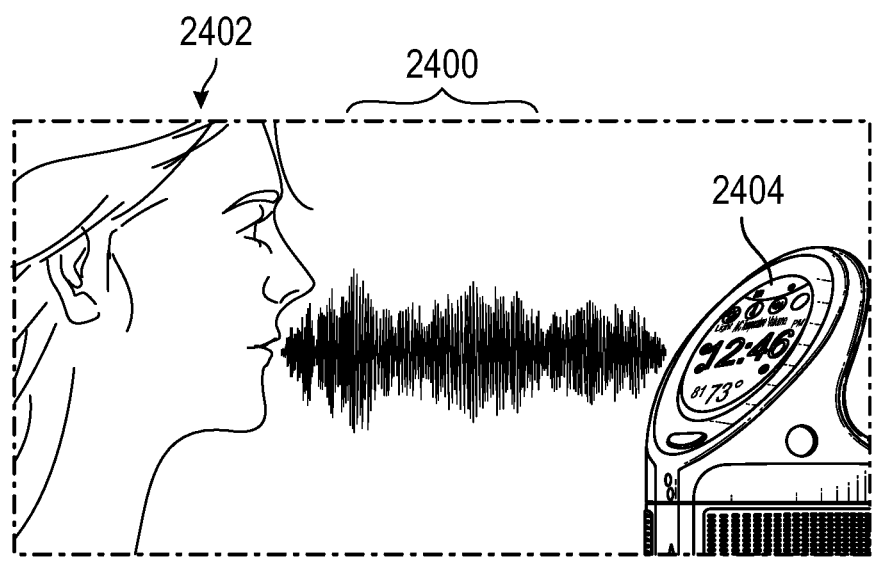
FIG. 24 is a detailed view of the display screen illustrating human and/or synthesized voice interaction with a hotel guest in accordance with various embodiments.

FIG. 24 is a close-up view of a voice interaction event 2400 involving a hotel guest 2402 and a display screen 2404, illustrating human and/or synthesized voice communication.

Refereeing now to FIGS. 25-29, an exemplary use case involving the synchronization of a digital mouth with packet of synthesized speech (e.g., a spoken word) will now be described.

Figure 25:
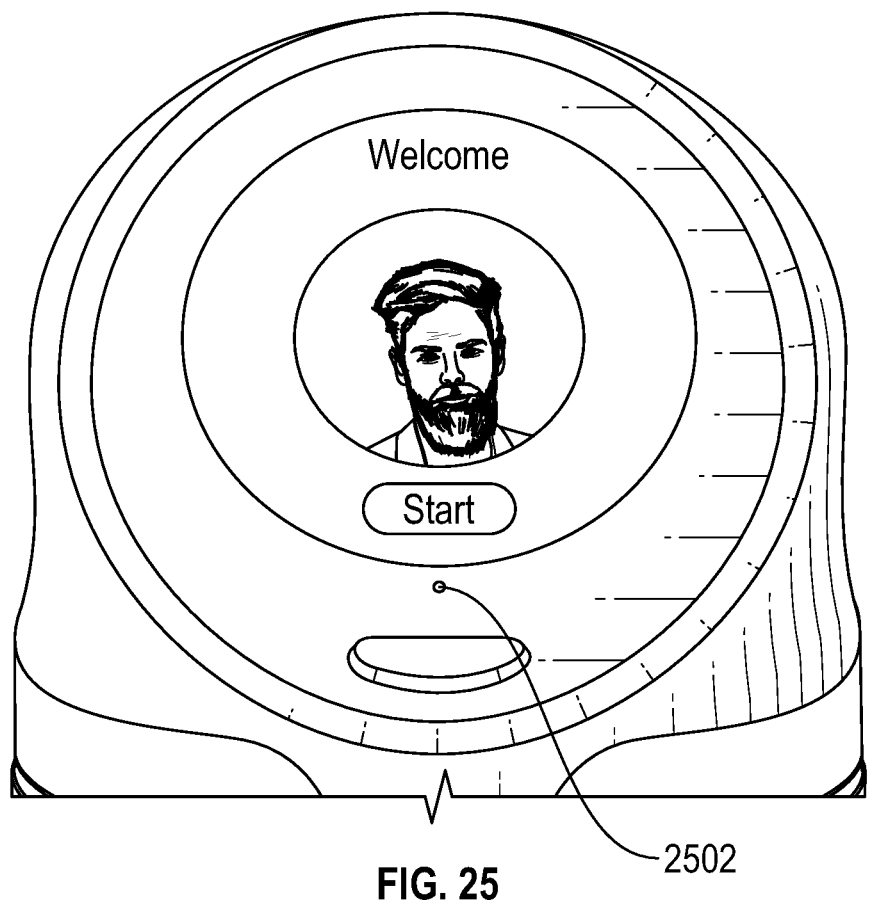
FIG. 25 is a schematic view of an anthropomorphic display depicting the mouth in the static (not speaking) position in accordance with various embodiments.

FIG. 25 is an anthropomorphic display depicting an exemplary mouth 2502 in the static (not speaking) position. This mouth expression may be employed when the device is not "speaking."

Figure 26:
FIG. 26 is a schematic view of an anthropomorphic display depicting the mouth beginning to expand laterally while preparing to speak in accordance with various embodiments.

FIG. 26 depicts a mouth 2602 beginning to expand (e.g., laterally) or otherwise presenting a visual indication alerting the user that the device is preparing to speak.

Figure 27:
FIG. 27 is a schematic view of an anthropomorphic display depicting the mouth fully extended prior to speaking in accordance with various embodiments.

FIG. 27 depicts a mouth 2702 fully extended or otherwise positioned to indicate that the digital mouth is just about to begin articulating a spoken word.

Figure 28:
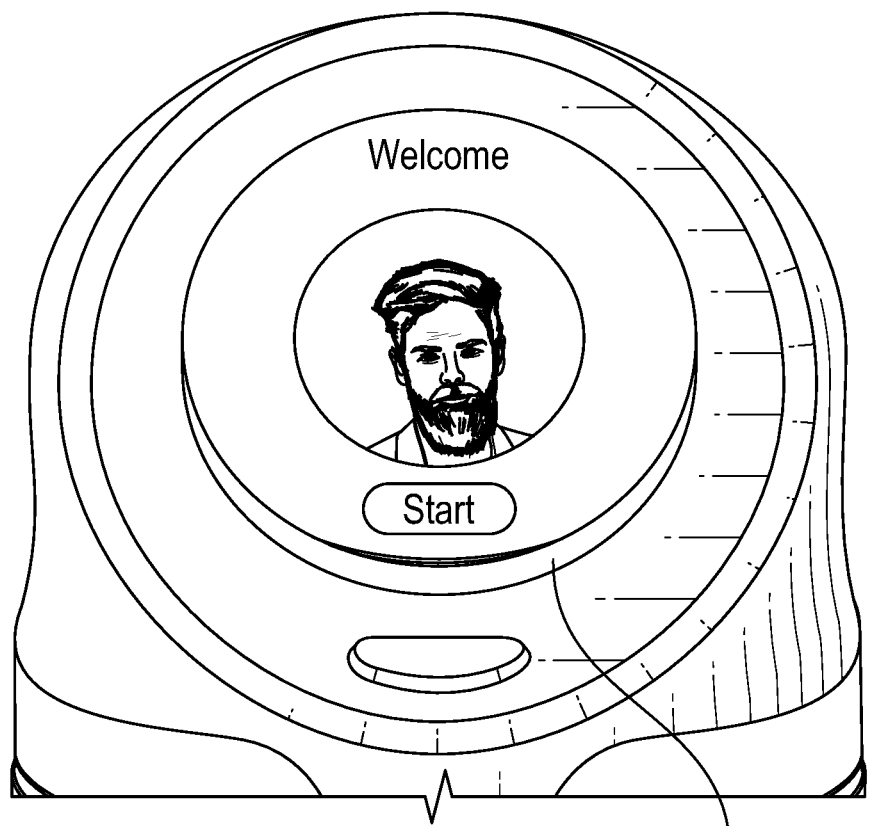
FIG. 28 is a schematic view of an anthropomorphic display depicting the mouth with lips narrowly parted to indicate commencement of a speech packet in accordance with various embodiments.

FIG. 28 depicts a mouth 2802 with lips narrowly parted or otherwise positioned to indicate initial commencement of speech. This position may be used to coincide with the initial audible perception of the synthesized speech.

Figure 29:
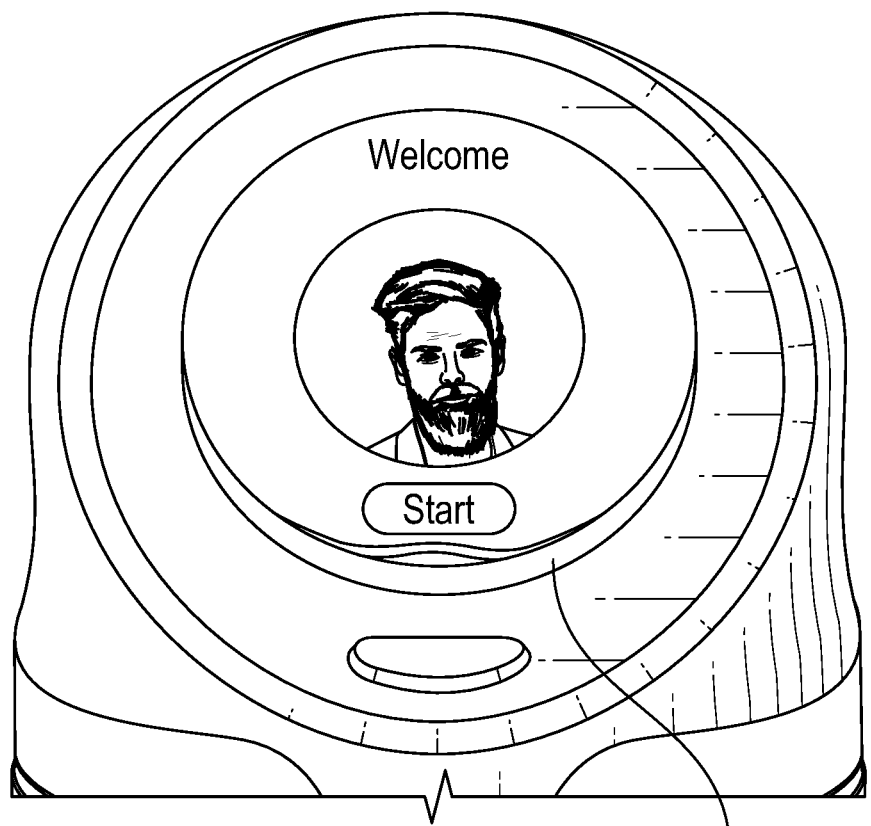
FIG. 29 is a schematic view of an anthropomorphic display depicting the mouth with lips widely parted to indicate termination of a speech packet in accordance with various embodiments.

FIG. 29 depicts a mouth 2902 with lips widely parted or otherwise configured to indicate termination of a speech packet. This visualization may be used to coincide with the end of the audible segment of a spoken word.

In this way, the user simultaneously receives both visual and aural indicia of the display "speaking," providing for a more intimate and robust user experience.

In other embodiments the term "CIRQ" or other term may represent a default custom call word for hotel and resort applications.

In other embodiments the resort (e.g., front desk) can use the control modules to broadcast messages (e.g., active shooter or other customized messages, notifications, alerts, instructions, warnings, or other emergencies or priority notices) to all rooms on or off the premises, a subset of rooms based on guest profiles or demographics (e.g., all convention participants), a particular wing or building, or the like.

Recognizing that even when a device is "off," it may still be listening for an "on" or "listen" command, the control module may include a manually slidable, disengageable, or otherwise configurable button or mechanical feature to physically disconnect the voice processor, microphones, sensors and other associated components thereby electrically unplugging and deenergizing the voice capture hardware to ensure guest privacy and data security.

Referring now to FIGS. 30-35, various embodiments of a disconnectable microphone circuit will now be described.

FIG. 30 is an exemplary base module 3000 having an interactive display 3002 and a manually disconnectable microphone and/or voice processing circuit 3004, described in greater detail below.

More particularly, FIG. 31A shows a disconnectable voice circuit module having a manually operable pull tab 3102 defined a selectively illuminated boundary 3104. In the position shown in FIG. 31A, the tab 3102 is in the connected position, such that the voice circuit is active; that is, the voice circuit is connected to power and data lines. In the activated state, the boundary 3104 may be illuminated to indicate that the voice function is "on", for example by displaying the color green.

FIG. 31B depicts the voice circuit module in the unplugged state, as a result of the pull tab being manually pulled outwardly along the direction indicated by the arrow 3106. In the unplugged state, the boundary 3104 may be de-illuminated or illuminated in a different color (e.g., red). Alternatively or in addition, a second boundary 3212 may display a second color (e.g., red) to further confirm that the voice circuit is disengaged.

FIG. 31C shows the assembly of FIG. 31B with the outer boundary of the base module cut away in the vicinity of the pull tab to show that the pull tab is mechanically connected to (directly or indirectly) to voice capture circuitry, as described in greater detail below in connection with FIGS. 32-34.

FIG. 32 is a schematic cut-away view taken along line XXXII-XXXII of FIG. 31B, illustrating the internal components of the connection assembly. More particularly, the pull tab 3302 is connected to a voice circuit board 3304 bearing one or more circuit components 3304 such as, for example, a microelectronic microphone and/or voice processor. Voice circuit board 3304 is connected to a power and/or data connector 3310 which, in turn, may be releasably connected (e.g., via USB) to a corresponding connections associated with a system processor or motherboard 3312. In the illustrated position, the connector 3310 is electrically and/or mechanically coupled to the motherboard 3312, thereby establishing a power and/or a data connection between the voice sub-circuit and the system controller associated with the motherboard 3312. When the pull tab (3302) is extended (pulled to the left in FIG. 32), the connector 3310 is separated from the motherboard 3312 to thereby disconnect the voice circuit components from power, data, and/or other system components creating an Opt-out status for the device.

FIG. 33A is a schematic view of a connection assembly illustrating an audio sub-circuit disengaged from the device or system processor. More particularly, the audio sub-circuit comprises a manually operable selector 3302, a voice circuit board 3306 having a microphone and/or a voice processing circuit 3308, and a first power/data connection port 3312. The first connection port 3312 is configured for releasable engagement with a corresponding connection port 3316 associated with a system circuit board 3314. The dashed line 3304 represents the outside surface of the device housing. FIG. 33B shows the audio circuit of FIG. 33A with the audio sub-system connection port 3312 engaged with (connected to) the system connection port 3316 upon moving the detector 3302 (and connected components) to the right.

With continued reference to FIG. 32 and also referring to FIG. 34, a pull tab or other actuator 3402 is connected (directly or indirectly) to a voice capture circuit 3404 which, in turn, is connected (directly or indirectly) to first connector 3410. The first connector 3410 is shown connected to a second connector 3412 associated with the device or system controller to supply power to the voice sub-circuit when connected.

FIG. 35 is an alternate embodiment of a disconnectable voice capture system 3500 comprising an off the shelf smart speaker 3502 (e.g., and Amazon Echo or functionally equivalent device) enclosed within or otherwise integrated into a device, where the device is operable via voice commands or otherwise configured to capture, process, and/or record audio.

With continued reference to FIG. 35, the voice capture system 3500 further includes a system circuit board 3508 including a data conduit (e.g., USB) 3504 and a power supply conduit 3506. A releasable connection assembly includes a switch, toggle, tab, slide, or other actuator (not shown in FIG. 35) connected to a voice circuit 3510. The connection assembly is configured to connect the voice circuit 3510 to the system circuit board 3508 (e.g., the data line 3504 and/or the power line 3506) when in the engaged position, and to disconnect the voice circuit 3510 from the system circuit board 3508 in the unplugged position.

While many of the above embodiments have been described in the context of speech utterances or other audio input, the invention is not so limited, and may be used in connection with any form of sensor device configured to sense an attribute of the environment. That is, rather than voice capture circuit 3404, various other sensors and data capture circuits may be used in some embodiments. Such sensors might include, for example, optical sensors, cameras, IR heat sensors, motion sensors, or the like.

Furthermore, actuator 3402 may be configured to react in some way to whether a particular sensed individual is within, entering, or exiting a room. That is, actuator 3402 may begin in a coupled (connected) state, and then automatically eject the actuator 3402 to an uncoupled state in the event that the system determines that a particular individual has entered the room. Such detection may be performed, for example, using face recognition, voice recognition and/or proximity of a mobile device (e.g., smart-phone, smartwatch, etc.) associated with that individual. In other embodiments, actuator 3402 begins in an uncoupled state by default, but then automatically enters a coupled state when it determines that a particular identified individual (or unknown individual) has entered the room. By way of example, the system may determine (e.g., through the sound of a window or door breaking, or the occurrence of some other event indicative of breaking and entering) that an individual has entered the room unlawfully, and that it should begin to record the sounds and/or other activity of that individual. The system may also automatically enter a coupled or uncoupled state based on whether there is one, two, or some predetermined number of individuals in the room. In accordance with various embodiments, all of the behavior of actuator 3402 is user configurable via an application (e.g., a mobile device app).

Other embodiments contemplate employee wearable panic button modules which may be Bluetooth or WIFI connected to beacons positioned within the hotel property or used through the employee's mobile phone. The system may be configured to track employees and to alert emergency personnel if an employee is assaulted or otherwise in need of assistance while on property. Accelerometers may be incorporated into the panic button module to detect a fall, and record audio if triggered. The panic signal emitted by the panic module can be detected by beacons located throughout the property, and a geo-fence violation broadcast when someone leaves the property. One embodiment, the panic button communicates with the CIRQ device; in other embodiments the panic buttons communicate with beacons located around the property.

Occupancy sensors and/or voice recognition systems may be employed keep track of all people in the room, permitting the control module to engage in multi-party conversations, or plural single party exchanges.

In an embodiment, the controller further includes a microphone for detecting guest voice commands, and a speaker for playing synthesized speech responsive to the voice commands.

Referring now to FIGS. 1-16, presently known mobile apps for controlling IOT devices offer a limited value proposition to the user, and are typically limited to consolidating multiple end point assets (e.g., lighting, door locks, HVAC) into a connected central guest room hub. In contrast, the present system offers a more robust value proposition to the guest user in the form of enhanced control of the user experience, amenity upgrades, rewards, personalization preferences and targeted/push marketing messages, offers and notices as well as enabling features (both on and off property) that would otherwise be unavailable without location services enabled.

Various embodiments contemplate monitoring the guest's location using the guest's mobile phone, wearable accessory, laptop, or any other GPS or location-enabled device. In this way, location aware (and hence context aware) features and services may be pushed to the guest in new and imaginative ways heretofore not contemplated by existing systems. Moreover, by incenting the guest to keep location services enabled even when the guest is off the hotel property, valuable tracking information may be collected, mined, and harvested to design precisely designed marketing messages delivered with pinpoint accuracy. An additional benefit of collecting aggregate location data surrounds the ability to conduct advanced analytics, and to offer customized guest benefits with guest room and property wide preferences based on these analytics.

From an enterprise standpoint, the system contemplates at least the following levels of value proposition: i) allowing the property to offer guests the ability to control and manage a plurality of IOT devices in the room using a mobile app, with low hardware and installation costs; ii) wirelessly controlling room temperature through a controller mounted within a bedside module; iii) thermal mapping and motion mapping using multiple sensors within a guest room to monitor occupancy through presence or respiration; iv) promoting conservation through gamification coupled with a loyalty rewards component; v) providing the guest with perks and other features which leverage location services (tracking); vi) mining the resulting aggregate location data facilitates the development of enhanced targeted marketing programs; and vii) allowing the hotel property the ability to substantially reduce power and water usage within each room; viii) the ability to migrate personal environmental and personal preferences from property to property.

The value proposition to the guest includes providing enhanced information to the mobile device thru the mobile app regarding the environment within and outside the room on their personal devices or in another functional use having the app running on the central hub. In various embodiments, this involves a cloud based system server (sometimes referred to herein as the CIRQ server) operating within the broader internet environment to thereby integrate the immediate environment (guest room) with the extended environment (the resort property, nearby attractions, and remote attractions).

In various embodiments, the in-room IOT control module is used to drive initial user engagement including operating a version of the mobile app and enabling guest connectivity and services, whereupon the resulting location awareness (tracking) may be used to drive further user engagement (e.g., on and off property perks, targeted and push marketing). Aggregate tracking data from multiple users may then be mined and harnessed to drive further targeted marketing notices, offers, messages, schemes, energy savings, and to analyze travel and spending trends. Indeed, the intersection among the PaaS System with in-room IOT control and location awareness alone has significant value in terms of energy savings for the property owner, as described below.

In addition, the system may be configured to gather performance data for the IOT devices and appliances, failure modes and trends, lifetime usage, servicing cycles/predictions and duty cycles in multiple geographic locations to thereby reduce long term total cost of use, increasing revenue/profit for the PaaS System and driving capital equipment replacement and upgrade timetables for property owners.

Figure 1:
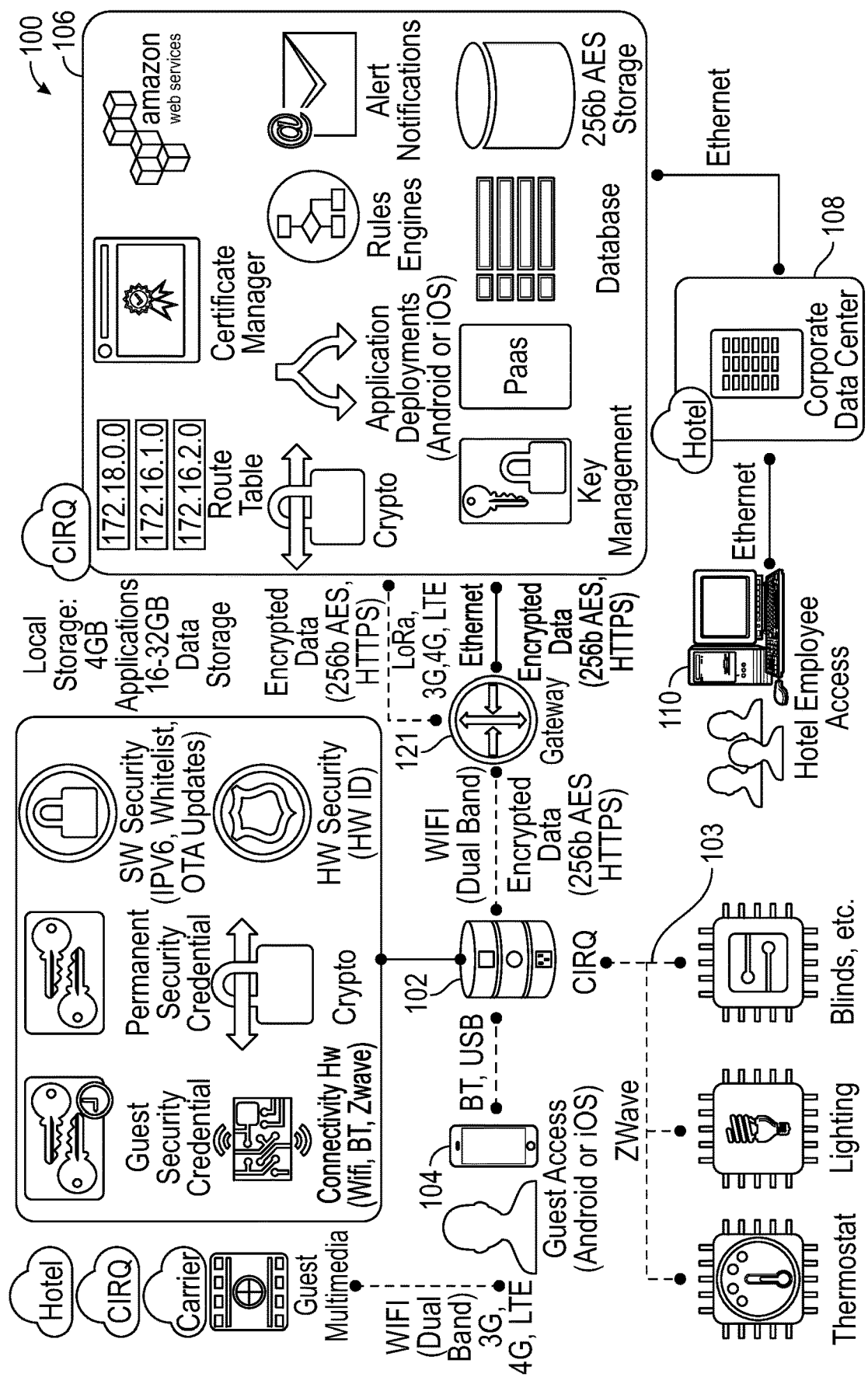
FIG. 1 is a schematic diagram of an enterprise level system for providing enhanced and engaging customization to the guest experience using a PaaS System with an in-room IOT module and an associated mobile app (or embedded system app and associated user interface) and API both configured to augment tracking data with contextual awareness m accordance with various embodiments.

Turning now to FIG. 1, a system 100 for providing enhanced customization to a guest experience includes an in-room IOT module 102 for controlling a local IOT network 103, an associated mobile app running on a guest mobile device 104, an enterprise server 106 including a PaaS platform, and a property owner server 108 configured to communicate with a facilities controller 110.

More particularly, the IOT module 102 is configured to communicate with the guest device 104 using Wi-Fi, Bluetooth, wired or wireless Ethernet, VPN, USB, Zigbee, Z-Wave, cellular (3G, 4G), or any radio bands other suitable wired or wireless protocol. The IOT module 102 is configured to communicate with the devices which comprise the IOT network 103 using ZWave, Bluetooth, or any suitable wired or wireless protocol. The IOT module 102 is configured to communicate with the enterprise server 106 through a gateway 121 (such as the internet) using Wi-Fi, LoRa, 3G, 4G, LTE, Ethernet, radio or any suitable wired or wireless protocol. Similarly, the enterprise server 106 is configured to communicate with the property owner server 108 using Wi-Fi, LoRa, 3G, 4G, LTE, Ethernet, radio or any suitable wired or wireless protocol.

In a typical use case, the guest device 104 communicates directly with the IOT module 102 when the guest device 104 is inside or otherwise closely proximate the hotel room. When the guest is outside the hotel room, off the hotel premises, or otherwise out of range of the IOT module 102, the guest device 104 communicates directly with the enterprise server 106 using a cellular network (e.g., 3G, 4G, LTE) radio or through a suitable wired or wireless internet connection.

Figure 2:
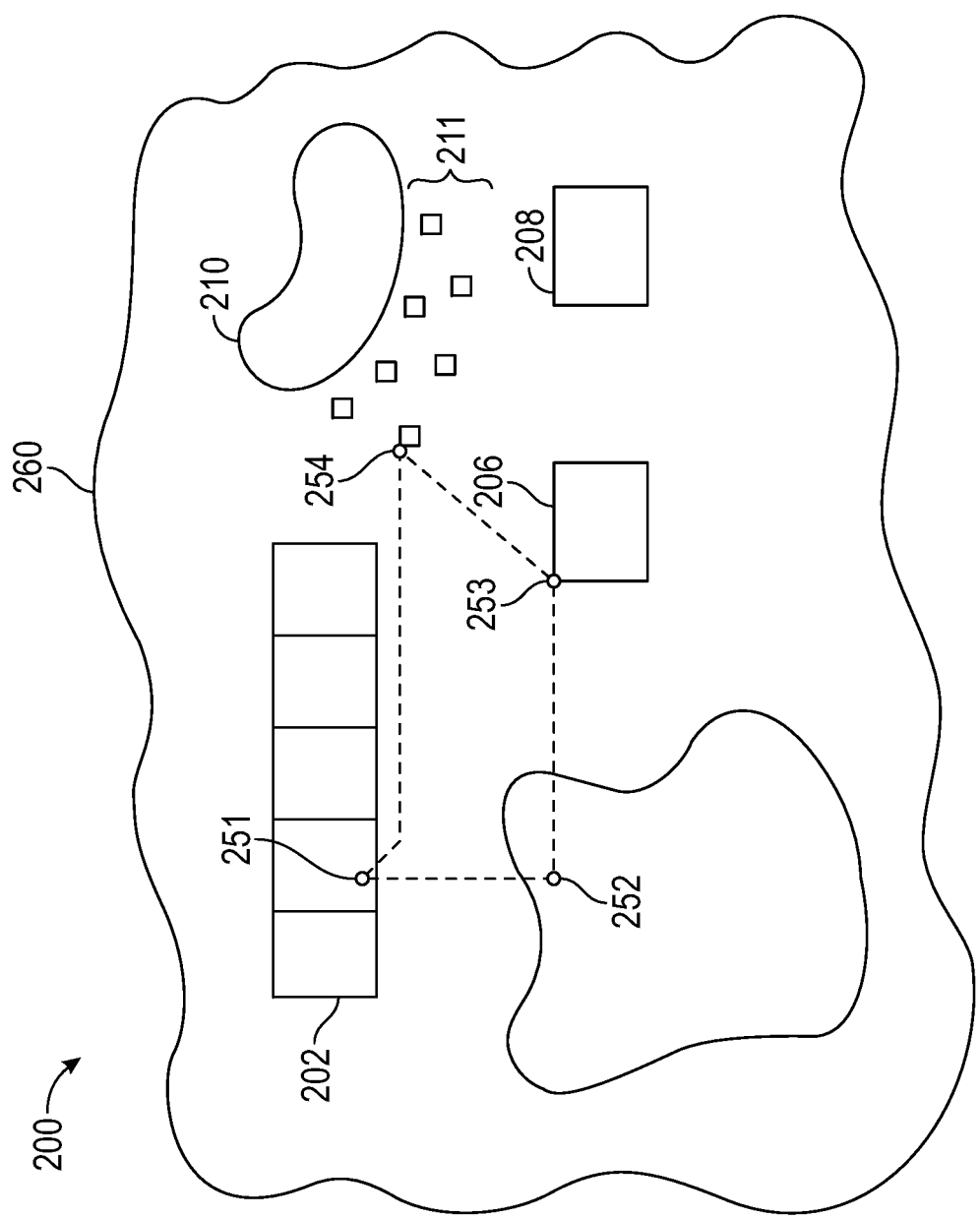
FIG. 2 is a schematic diagram of a hotel property illustrating tracking data for a hotel guest within the boundary of the hotel property in accordance with various embodiments.

FIG. 2 is a schematic diagram of a hotel property 200 illustrating tracking data for a hotel guest within the boundary of the hotel property. In the illustrated example, the mobile app tracks the guest's movement from a guest room 202 (point 251), to golf course (point 252), to a restaurant 206 (point 253), to a particular one of a plurality of cabanas 211 adjacent a pool 210 (point 254), and back to the room (point 251). A geo-fence 260 defines the boundary of the hotel, resort, or time share property.

Figure 3:
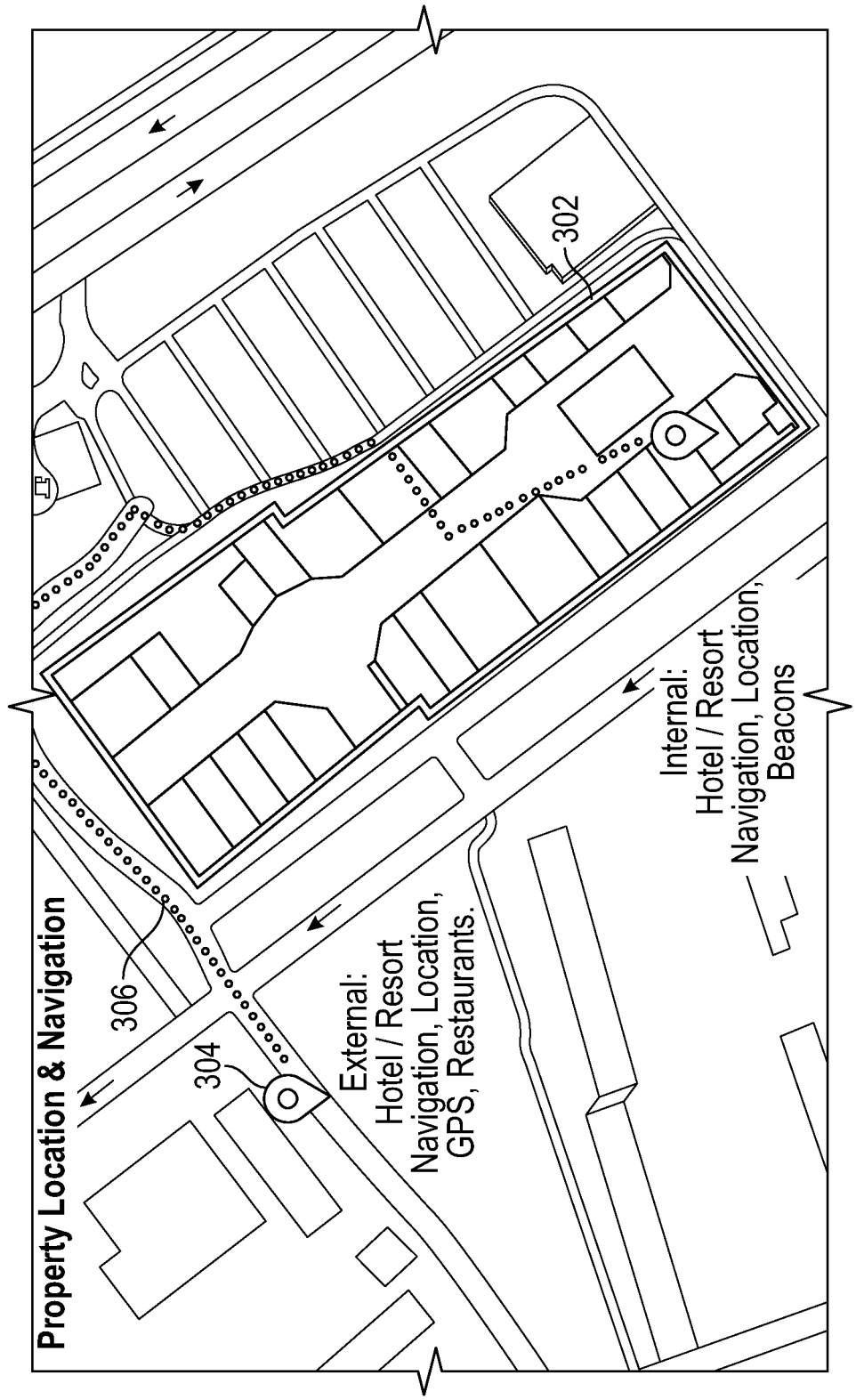
FIG. 3 is a schematic diagram illustrating tracking data for a hotel guest within and outside the boundary of the hotel property with cellular or area Wi-Fi in accordance with various embodiments.

FIG. 3 is a schematic diagram illustrating tracking data 306 for a hotel guest within and outside the boundary 302 of a hotel property as the guest visits an off premises location 304 (tourist attraction, restaurant, office, theater, or the like).

Figure 4:
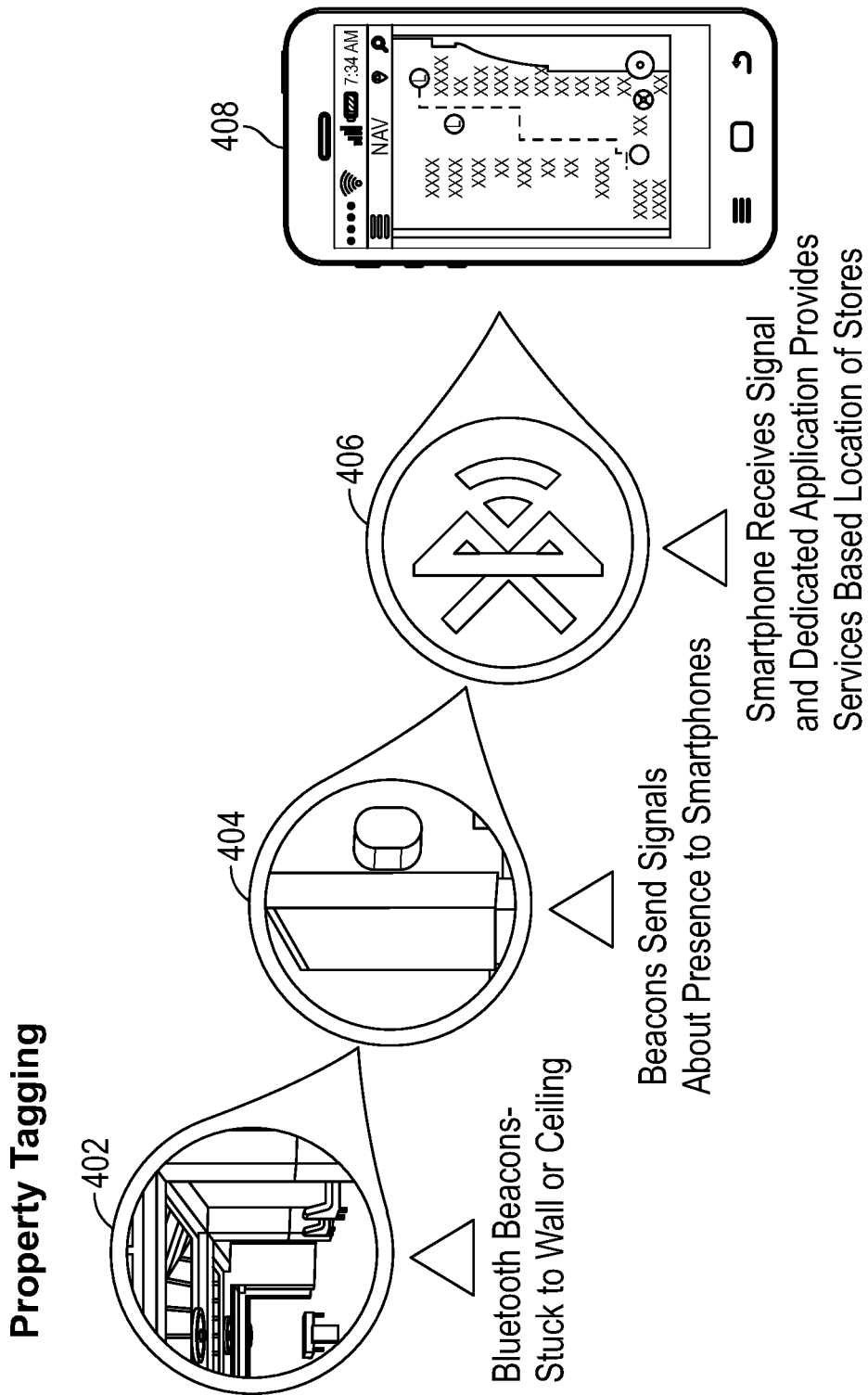
FIG. 4 is a schematic diagram illustrating the use of beacons in addition to and/or in lieu of traditional GPS based location services in accordance with various embodiments.

FIG. 4 is a schematic diagram illustrating the use of beacons in addition to and/or in lieu of traditional GPS based location services. More particularly, FIG. 4 depicts a hallway 402 including wall mounted beacons or embedded building or infrastructure sensors. Each beacon 404 is configured to send static location information to the mobile app using Bluetooth or similar protocols 406. In this way, even without enabling location services, the mobile app can display the locations of various hotel amenities on the mobile device screen 408.

Figure 5:
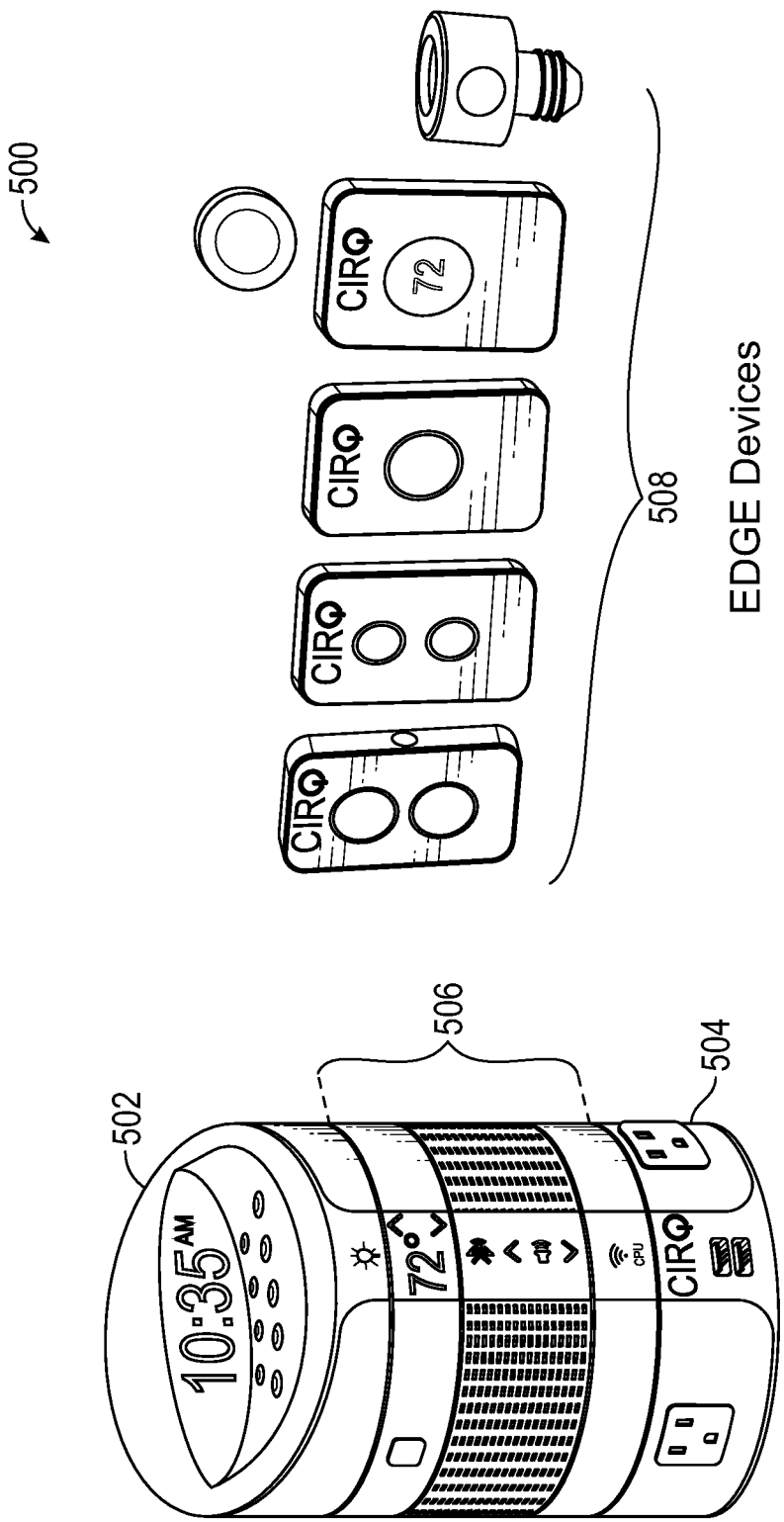
FIG. 5 is a schematic diagram of an exemplary in room IOT network that is part of a unified PaaS system including a base module and a plurality of edge devices in accordance with various embodiments.

Referring now to FIGS. 1 and 5, an exemplary PaaS system with an in-room IOT network system controller 500 includes a control module 502 and a plurality of IOT devices (referred to herein as Edge devices) 508. In particular, the control module 502 includes a base 504 and a plurality of stacked electronic modules 506, each of which is configured to communicate with, monitor, and/or control one or more of the edge devices.

Figure 6:
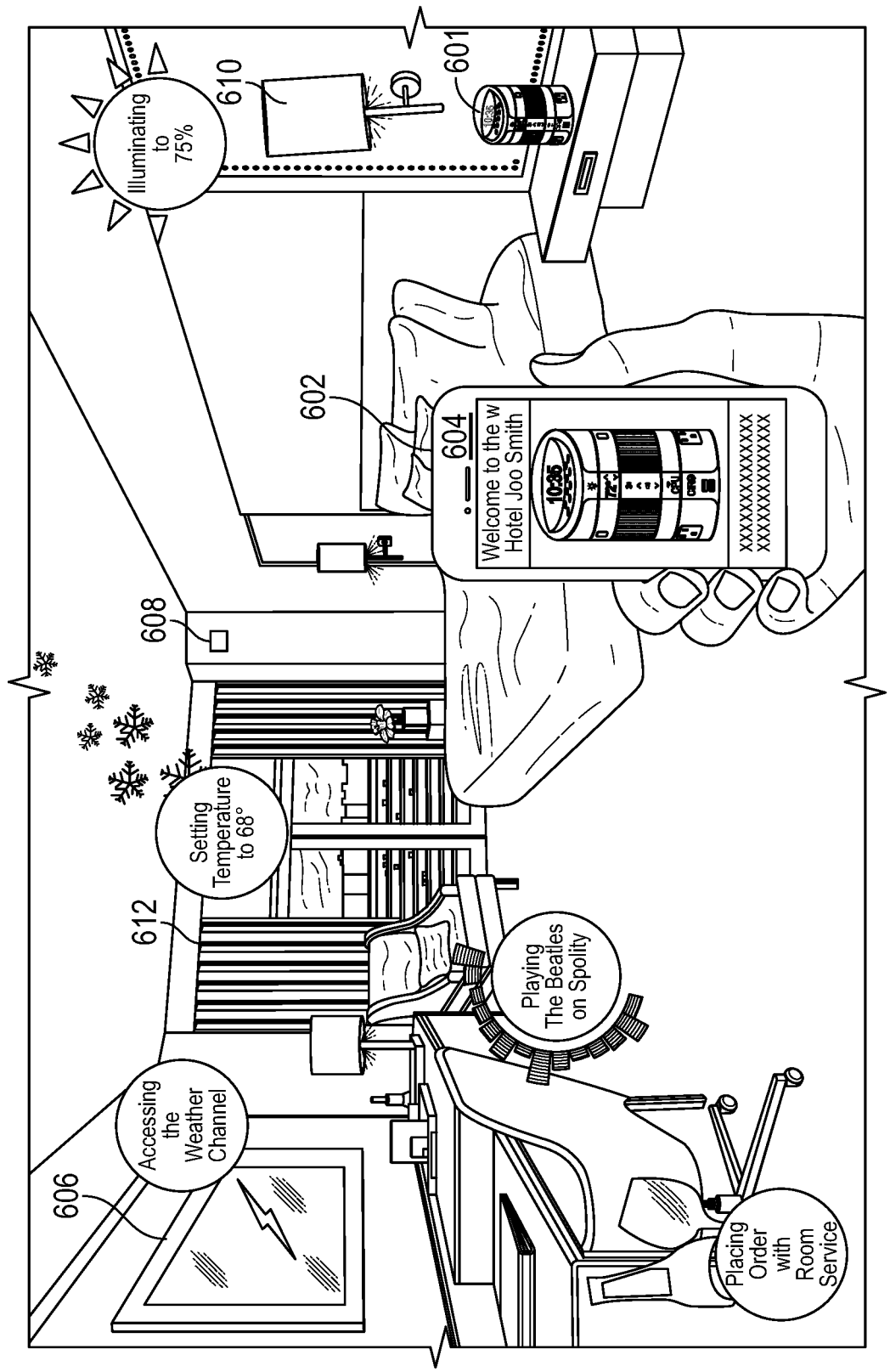
FIG. 6 is a schematic diagram illustrating a mobile app operating on a mobile device and controlling a plurality of IOT devices in accordance with various embodiments.

FIG. 6 is a schematic diagram illustrating a mobile device 602 operating a mobile app 604 for controlling an IOT module 601 which, in turn, coordinates a plurality of IOT devices such as, for example, an entertainment system (e.g., television) 606, a thermostat or other HVAC controller 608, lighting 610, motorized window coverings 612, and a services module 614 for coordinating resort amenities (e.g., room service, reservations for local restaurants and tourist attractions).

FIG. 7 is a more detailed view of an exemplary IOT control module 702 including a base 704 having one or more female AC adapters 705, and a CPU module 706 including a Wi-Fi component, a ZigBee Multi-Band IoT Mesh Network Technology component, and/or a hard drive component. The control module 702 further includes an audio module 708 including a speaker and/or microphone component, a sensor module 710 including a remote thermostat module with thermo-sensors and ultrasonic sensors and motion and/or infrared sensor module, a smart LED module 712, and a utility module 714 including a digital alarm clock, a radio, and an optional mobile docking/charging station. An alternative embodiment of a mobile docking/charging station 716 is shown charging a smart phone 718. In this regard, the sensor module 710 may also include one or more radar antennas in the head unit configured to triangulate with the relay radar antenna to facilitate occupancy detection.

Figure 8:
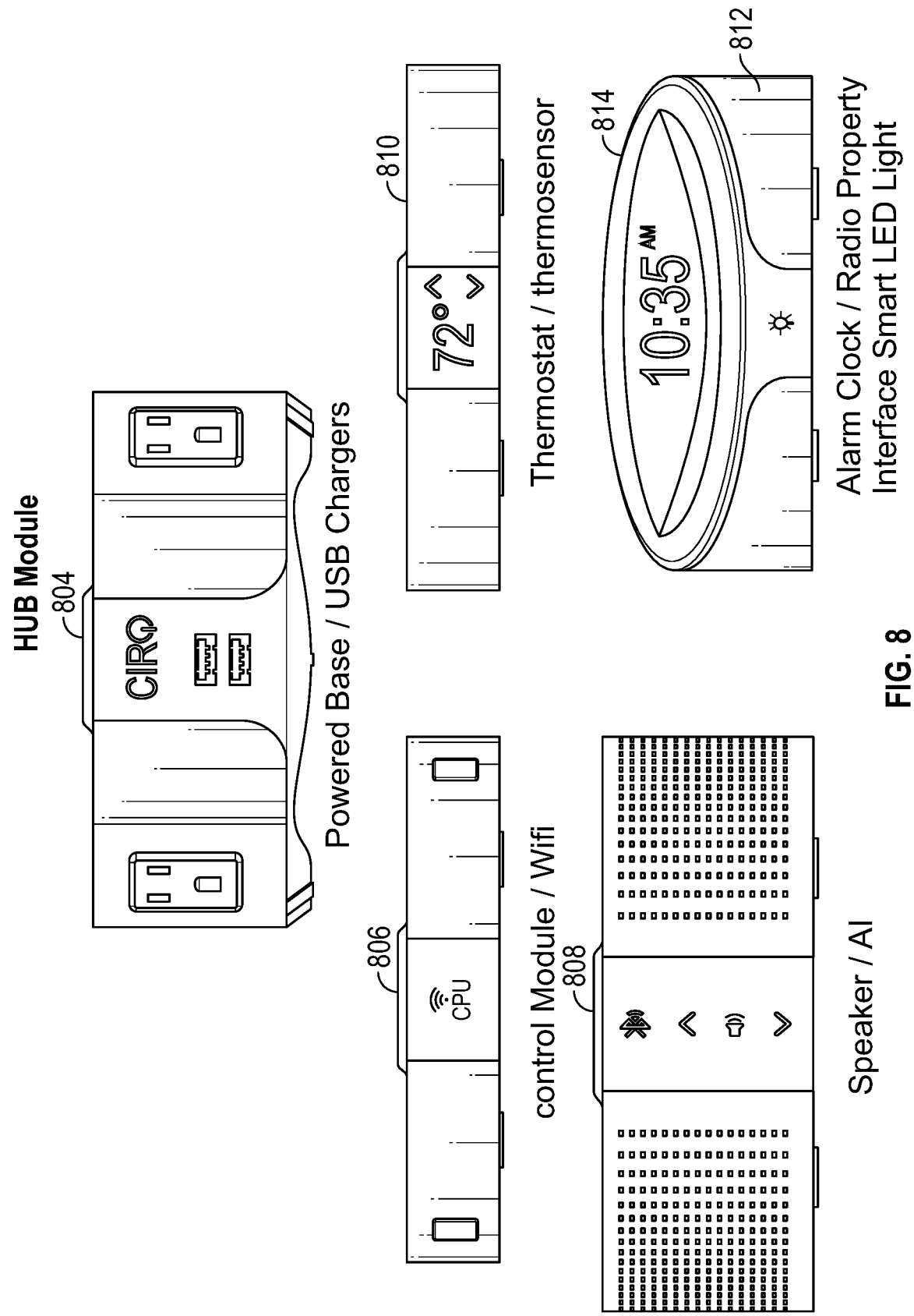
FIG. 8 is a schematic view of the stackable electronic hub modules shown in FIG. 7 in accordance with various embodiments.

FIG. 8 is a schematic view of the stackable electronic hub modules shown in FIG. 7, including a base module 804, a CPU module 806, an audio module 808, a remote thermostat and occupancy/thermo-sensor module 810, a lighting module 812, and a utility module 814.

Figure 9:
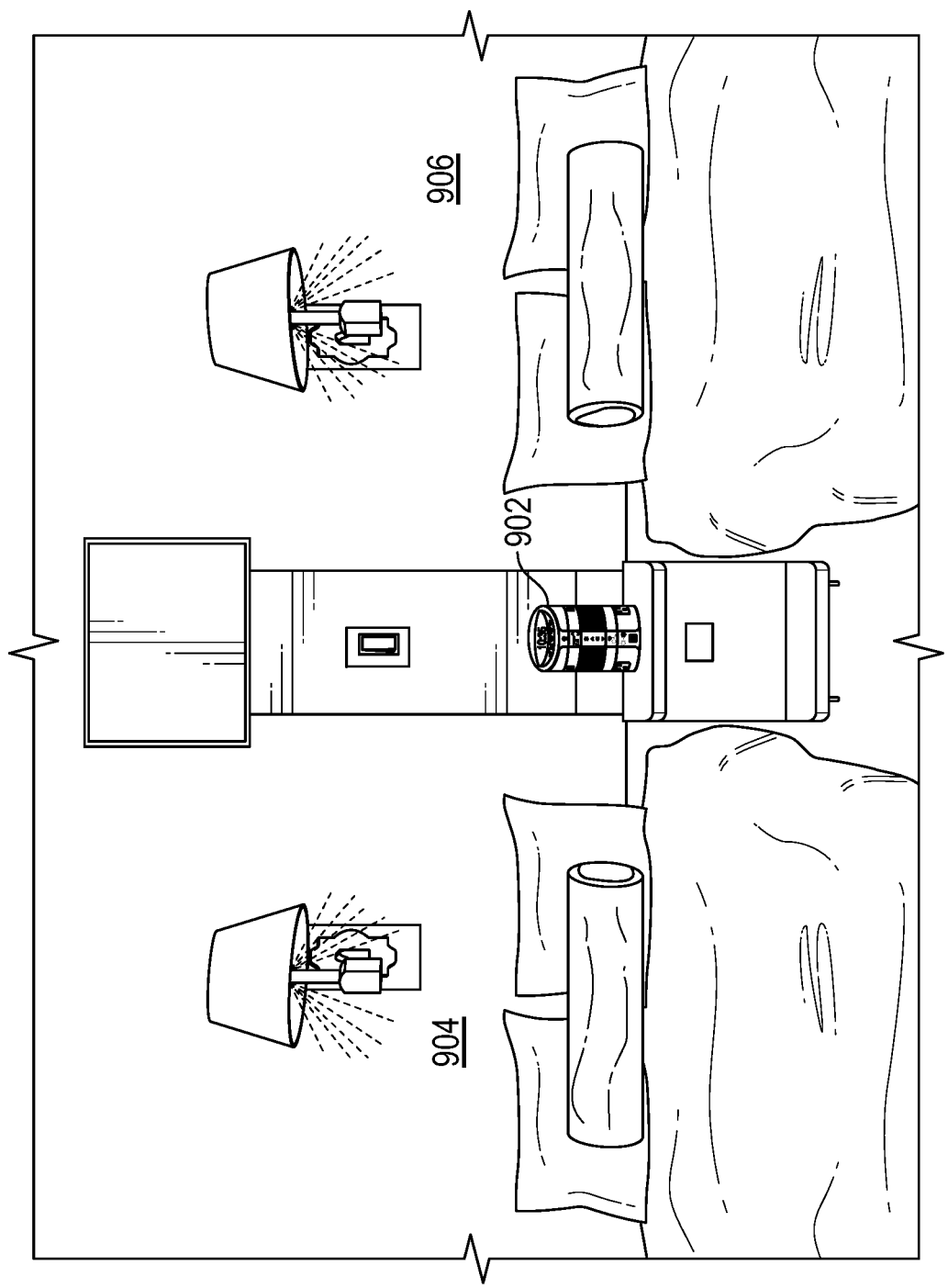
FIG. 9 is a schematic view of a base module disposed between two beds in a typical hotel, resort, or time share environment in accordance with various embodiments.

FIG. 9 is a schematic view of an IOT controller 902 disposed between a first bed 904 and a second bed 906 in a typical hotel, resort, or time share room environment. In the illustrated embodiment, the modular stack may include a remote relay to be used in the place of a traditional wall thermostat with the motion, radar, and/or infrared sensors (not shown) may be positioned so that full room coverage may be obtained using a minimum number of sensors (e.g., 2). Additionally by having the remote thermostat bedside the guest will be able to adjust the temperature controls on the remote thermostat and user interface and as well using the mobile app without leaving the bed.

Figure 10:
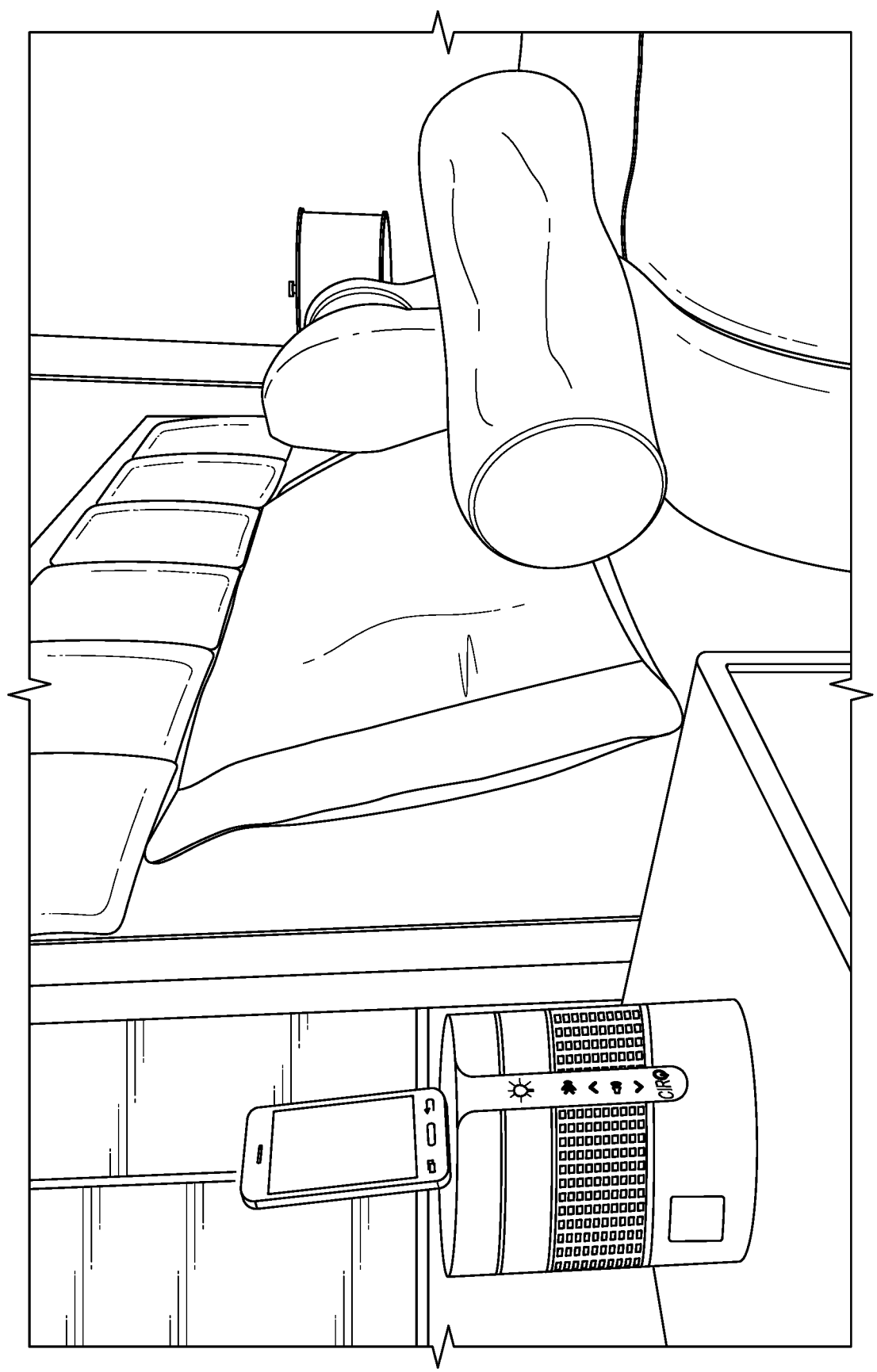
FIG. 10 is a schematic view of a base module disposed bedside, illustrating a smart phone charging station in accordance with various embodiments.

FIG. 10 is a schematic view of an alternative embodiment of an IOT control module disposed on a bedside table, illustrating a smart phone charging station on a top surface of the IOT control module.

Figure 11:
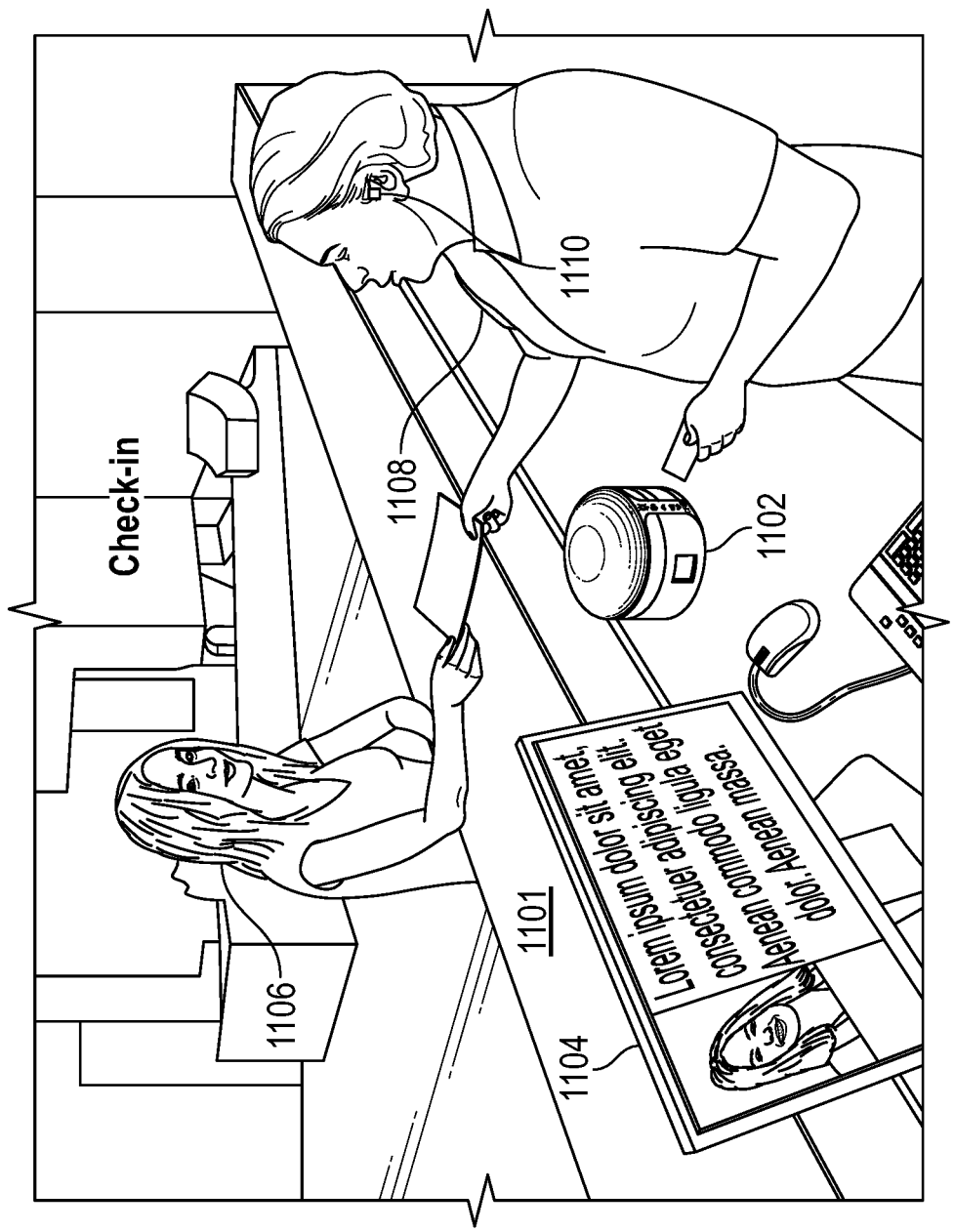
FIG. 11 is a schematic view of an alternative embodiment of a base module, illustrating a hotel employee addressing a guest by name based on real time location tracking in accordance with various embodiments delivering a more welcoming and personalized experience.

FIG. 11 is a schematic view of a front desk 1101 equipped with a base module 1102 configured to communicate with or embody a display 1104. In the illustrated embodiment, as a guest 1106 approaches a hotel employee 1108, the guest's location is tracked by the system, and the guest's name may displayed on the screen 1104, or spoken to the employee through an ear piece 1110. In this way, the employee may address the guest by name using on real time location tracking data.

Figure 12:
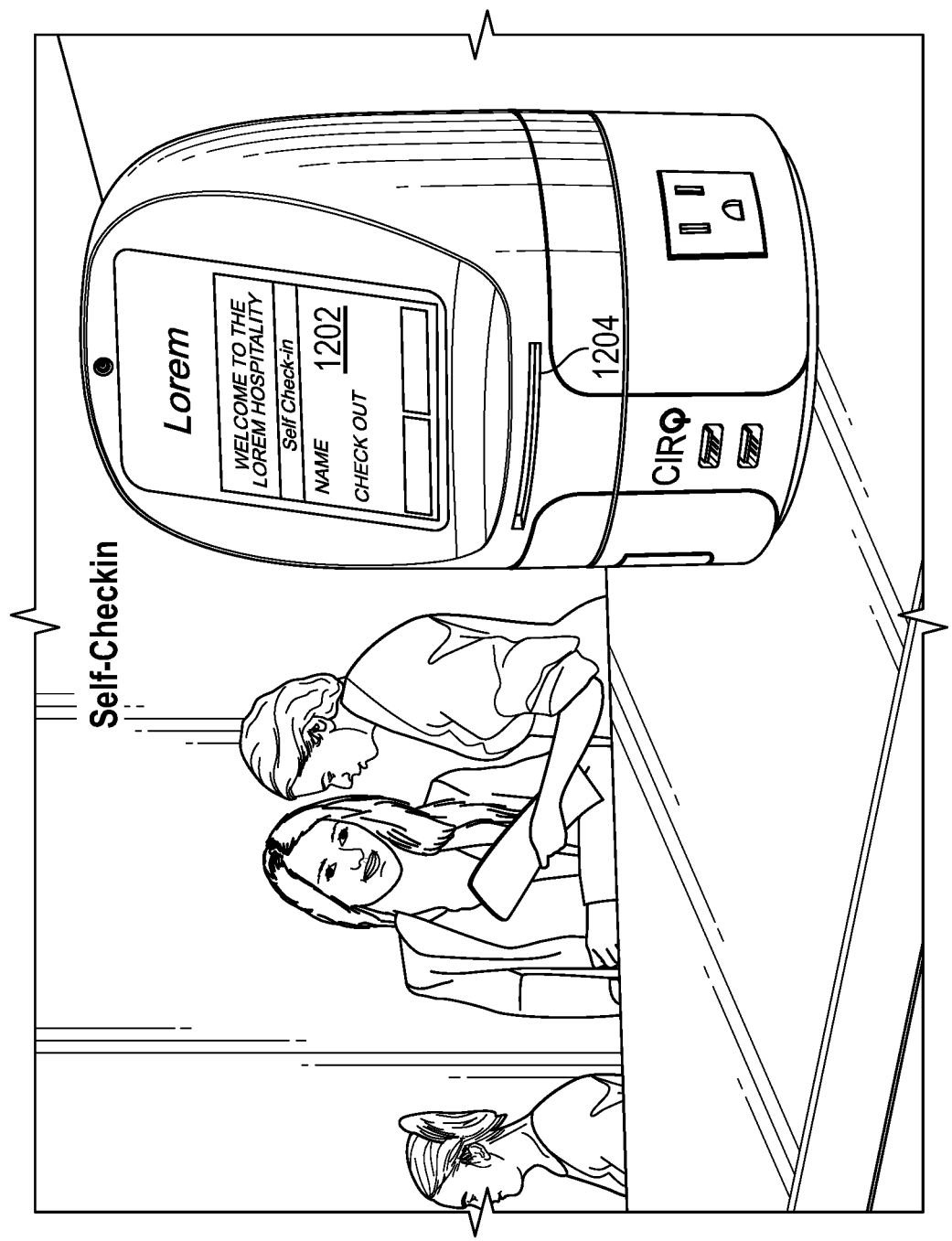
FIG. 12 is a schematic view of an alternative embodiment of a base module illustrating a self check-in and check-out system in accordance with various embodiments.

FIG. 12 is a schematic view of an alternative embodiment of a base module illustrating a self check-in and check-out module system allowing guests to perform self-registration, room upgrades and check-in into the property without having to directly interact with a property owner staff or employee, expediting their access to the purchased room. The illustrated embodiment includes a user interface, a display 1202, and a key card maker and credit card reader 1204.

Figure 13:
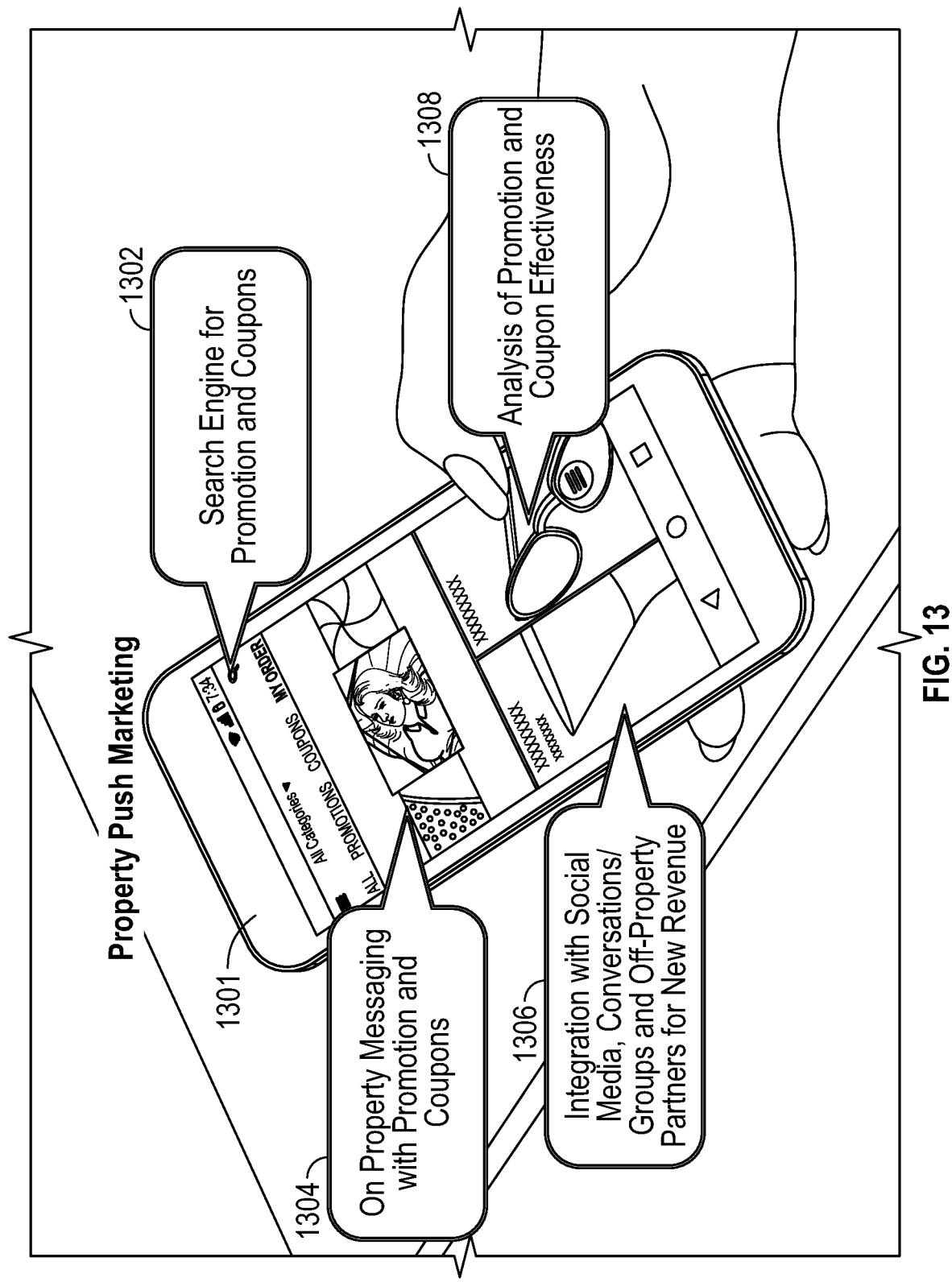
FIG. 13 is a screen display of a mobile app operating on a smart phone illustrating targeted marketing vectors in accordance with various embodiments.

FIG. 13 is an exemplary guest smart phone 1301 running a mobile app configured to display a property specific search feature 1302 for services, searching promotions, upgrades, and incentives, a proprietary (on property) messaging portal 1304 for receiving notices, offers, promotions and messages, an integrated social media portal 1306, and an analytics portal 1308. Alternatively, the foregoing functionality may be hosted locally or remotely, without the need for the guest to download a mobile app.

Various embodiments of the present invention remote thermostatic control of an in-room heating, ventilation, and air conditioning (HVAC) unit such as a packaged terminal air conditioner (PTAC). PTACs are typically single, commercial grade, self-contained units installed through or inside a wall or window of a hotel guest room. A PTAC's compressor system both cools and heats. To cool, the units compressor pumps refrigerant to cool the coils which attracts heat and humidity which is then exhausted to the outside. To heat, this functionality is reversed. The refrigerant is used to heat the coils, and when air passes over it the unit pushes the heated air into the room. PTACs are larger than a typical through-the-wall air conditioner and can be wired controlled through the relay or wireless controlled via the in-room hub.

Figure 14:
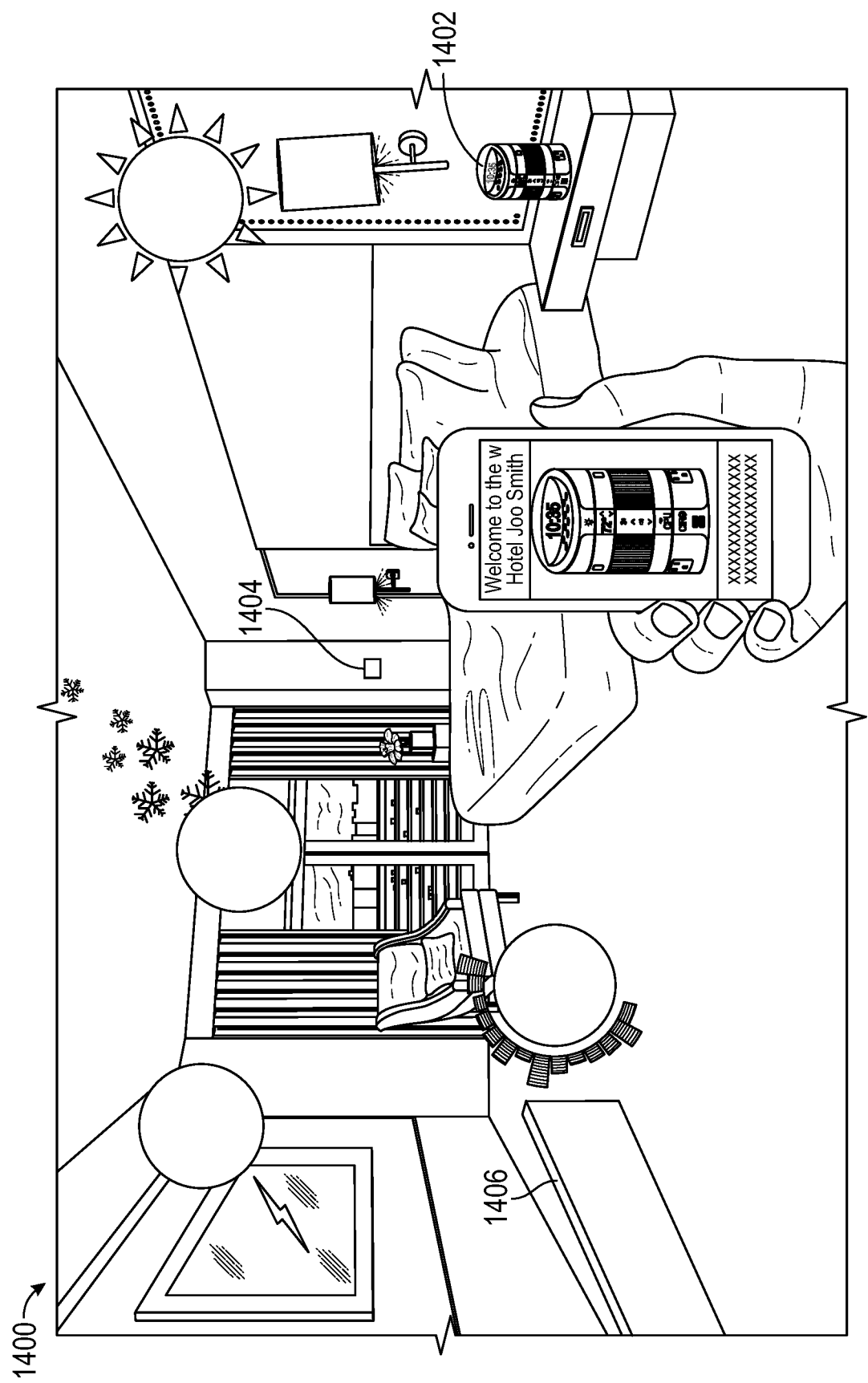
FIG. 14 is a schematic diagram of an in-room OT module configured to wirelessly communicate with a relay which replaces a conventional wall-mounted thermostat to thereby control an in-room heating, ventilation, and air conditioning (HVAC) unit such as a packaged terminal air conditioner (PTAC) in accordance with various embodiments.

With continued reference to FIGS. 5-10 and also referring now to FIG. 14, a remote thermostatic control system 1400 includes an in-room IOT module 1402, a relay 1404 designed to replace a conventional wall-mounted thermostat (not shown), and an HVAC unit 1406 (e.g., a PTAC). In the illustrated embodiment, the IOT module 1402 includes a thermostat controller operable by the user to remotely (e.g., wirelessly) control the state of the relay 1404 which, in turn, operates the PTAC 1406 in much the same way (typically a wired connection) as the wall mounted thermostat previously did so before being replaced (or augmented) by the relay.

Figure 15:
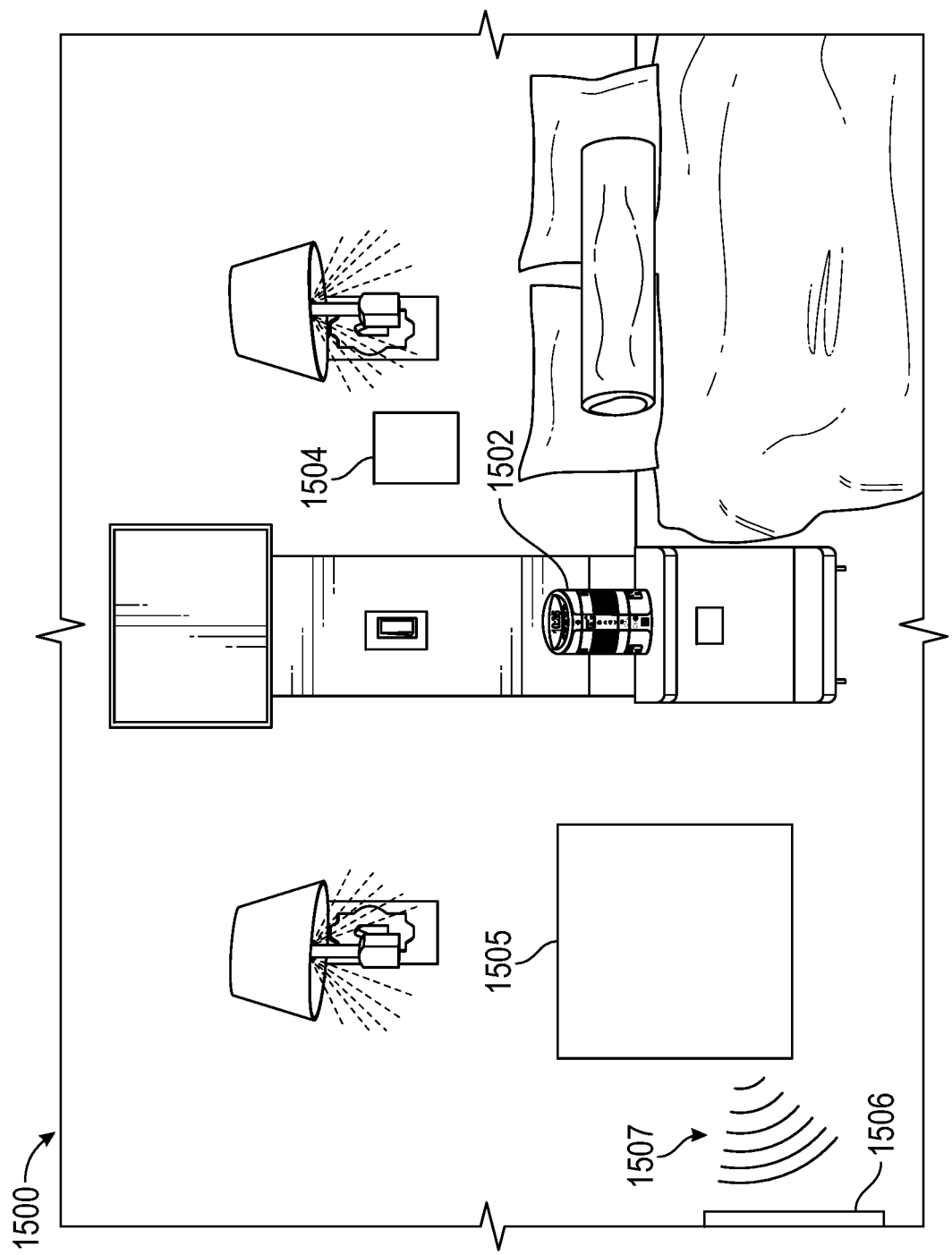
FIG. 15 is schematic diagram of an in-room IOT module configured to wirelessly communicate with a secondary wireless module which wirelessly controls a PTAC or any other HVAC unit in accordance with various embodiments.

In an alternate embodiment, FIG. 15 depicts a remote thermostatic control system 1500 including an IOT module 1502 and other in-room connected array of sensors configured to communicate (e.g., wirelessly) with one or more secondary wireless modules 1504, 1505, and an HVAC unit 1506 (e.g., a PTAC). In the embodiment shown in FIG. 15, the IOT module 1502 includes a thermostat module which transmits (e.g., wirelessly) a desired temperature setting (e.g., set point) to one or both of the secondary wireless modules 1504, 1505 to thereby operate (e.g., wirelessly 1507) the PTAC 1506. In one embodiment, the user controls the PTAC 1506 using a handheld device 1504 (e.g., mobile phone, laptop, or other remote control device) which optionally displays a graphical user interface. In an alternate embodiment, the user may control the PTAC 1506 using a large screen display (e.g., computer monitor or television) which optionally displays a graphical user interface.

The embodiments described in conjunction with FIGS. 14 and 15 are particularly advantageous in that the temperature sensor associated with the thermostatic control system may reside within the bedside or table top IOT module removed from the wall. In either case, the sensed temperature corresponds to the temperature proximate the hotel guest, particularly whilst the guest is sleeping. This allows the system to more precisely control the relevant temperature, ensuring thermal comfort while conserving electricity by avoiding unnecessarily heating or cooling regions of the guest room not occupied by the guest.

Referring now to FIG. 16, a distributed monitoring and sensing system 1600 includes an in-room IOT module 1602 coupled (e.g., wirelessly) to a plurality of distributed sensors 1604, 1606, 1608 equipped to monitor motion and/or temperature at a plurality of zones. For example, a first sensor 1604 may detect the temperature (or other environmental conditions such as smoke, carbon monoxide, brightness level, sound, and/or humidity) as well as the presence of or motion of people (or pets) in a region of the room remote from the bedroom. A second sensor 1606 may be configured to monitor one or more of the foregoing parameters proximate a balcony or window. A third sensor 1608 may be configured to monitor one or more of the foregoing parameters proximate a sitting area, an additional room, or other strategic location within the guest suite.

In accordance with the foregoing embodiments, by monitoring environmental parameters and the presence or motion of people at various locations within the living quarters, the system may precisely monitor and/or control energy and other resource consumption. By way of non-limiting example, the system may be configured to open or close window curtains or blinds in coordination with sunrise, sunset, and overcast conditions to thereby influence temperature control within the entire room or within discreet zones. Moreover, the system may optimize temperature, other environmental conditions, or the use of electronic devices as people migrate into and out of the living quarters or sub-zones thereof. The system will also allow for guest to migrate their personal preferences from property to property.

In accordance with further embodiments, the in-room IOT module and/or the underlying operating platform may include incentive, reward, or point based components configured to gamify energy conservation objectives. For example, the system may be configured to compile individual guest and/or aggregate data surrounding consumption of electricity, gas, cold water, hot water, towel and bed linen usage, and other consumables. By establishing usage targets or thresholds, hotel guests may earn loyalty credits or other redeemable points in a gamified context, while at the same time promoting "green" conservation policies.

In an embodiment, cellular data to and from the guest mobile device may be routed thru the CIRQ cloud 106 back to the hotel chain server 108 (See FIG. 1). Various use cases enabled by the system share the following features: i) a PaaS System; ii) an in-room IOT control hub module which communicates with the mobile app and various edge devices and hotel services (food, drinks); and iii) tracking of guest location in the CIRQ cloud. The integration of the in-room IOT network with guest tracking data gives rise to a vast array of novel features, use cases, and anecdotal attributes, including the following non-limiting examples.

In a typical swimming pool, beach, golf course, concert venue, or other resort environment having multiple potential guest locations (e.g., bar stools, tables, cabanas, chaise lounges, stadium seats), location awareness allows the server to walk a straight line to bring the correct drink or food order directly to the right guest.

In an embodiment the guest can use the in-room module to control the local IOT devices even without downloading the app, but the guest can control the module with the mobile device if the guest downloads the app to the mobile device.

Although preferred embodiments are described in the context of hotel room, those skilled in the art will appreciate that IOT control modules may be installed in any number of environments such as Air B&B rentals, residential, condominium communities, and the like.

A preferred embodiment would allow for a second action of a notification to confirm voice Opt-in or Opt-out mode via an integrated device display, proximal detached display, or a guest or user mobile device.

Other embodiments permit a double opt-in and opt-out method where a guest would slide the mechanism to a desired position corresponding to a desired opt-in or opt-out state, and have a second notification confirming the selected state either on a display located on the unit or on a user's personal mobile device.

The invention claimed is:

1. A hotel room environmental control module, comprising:
a housing configured for table-top mounting;
a system controller operable by a hotel guest to wirelessly control internet-of-things (TOT) devices in the hotel room using voice commands;
a touch interactive screen extending above the housing;
a voice capture circuit including a microphone; and
a switch disposed proximate an outside surface of the housing and manually operable between: i) a first position in which the microphone is mechanically and electrically connected to the system controller; and ii) a second position in which the microphone is mechanically and electrically disconnected from the system controller.

2. The control module of claim 1, wherein:
the voice capture circuit is enabled when the switch is in the first position; and
the voice capture circuit is disabled when the switch is in the second position.

3. The control module of claim 2, wherein:
the system controller supplies power to the voice capture circuit when the switch is in the first position; and
no power is supplied to the voice capture circuit when the switch is in the second position.

4. The control module of claim 1, wherein:
a terminal end of the switch is substantially aligned with the outside surface of the housing when the switch is in the first position; and
the terminal end of the switch is extended away from the outside surface of the housing when the switch is in the second position.

5. The control module of claim 4, wherein the switch comprises one of a toggle, a button, a slide mechanism, a pull tab, and dial.

6. The control module of claim 1, wherein the voice circuit further comprises a voice processor.

7. The control module of claim 6, wherein: i) the voice processor is electrically connected to the controller when the switch is in the first position; and ii) the voice processor is electrically disconnected from the controller when the switch is in the second position.

8. The control module of claim 1, further comprising a selectively illuminated region proximate the switch, the selectively illuminated region configured to exhibit a first visual state when the switch is in the first position and a second state when the switch is in the second position.

9. The controller of claim 8, wherein the first and second states correspond to first and second colors, respectively.

10. The controller of claim 8, wherein the first and second states correspond to illuminated and non-illuminated states.

11. The controller of claim 9, wherein the selectively illuminated region comprises a boundary surrounding at least a portion of the switch.

12. The controller of claim 1, further comprising a first connecter associated with the voice circuit and a second connector associated with the system controller.

13. The controller of claim 12, wherein:
moving the switch from the second position to the first position brings the first connector into mechanical and electrical engagement with the second connector; and
moving the switch from the first position to the second position mechanically and electrically disconnects the first connector from the second connector.

14. The controller of claim 1, wherein the system controller is configured to provide at least one of:
a first audio confirmation when the switch is in the first position; and
a second audio confirmation when the switch is in the second position.

15. The controller of claim 1, wherein the display is configured to provide at least one of:
a first visual confirmation when the switch is in the first position; and
a second visual confirmation when the switch is in the second position.

16. The controller of claim 1, wherein the control module is configured to provide at least one of:

a first haptic confirmation when the switch is in the first position; and
a second haptic confirmation when the switch is in the second position.

17. A method of selectively connecting and disconnecting a microphone associated with a hotel room environmental control module of the type including: a housing configured for table-top mounting; a system controller operable by a hotel guest to wirelessly control internet-of-things (IOT) devices in the hotel room using voice commands; a touch interactive screen extending above the housing; a microphone; and a switch disposed proximate an outside surface of the housing, the method comprising the step of:
manually moving the switch between i) a first position in which the microphone is mechanically and electrically connected to the system controller; and ii) a second position in which the microphone is mechanically and electrically disconnected from the system controller.

18. The method of claim 17, further comprising the step of:
manually moving the switch into a second position in which the microphone is disconnected from the system controller.

19. A hotel room environmental control module, comprising:
a housing configured for table-top mounting;
a system controller operable by a hotel guest to wirelessly control internet-of-things (TOT) devices in the hotel room using voice commands;
a touch interactive screen extending above the housing;
a voice capture circuit including a microphone; and
a switch disposed proximate an outside surface of the housing and manually operable between a first position in which the microphone is mechanically and electrically connected to the system controller, and a second position in which the microphone is mechanically and electrically disconnected from the system controller;
wherein the voice processor is electrically connected to the controller when the switch is in the first position; and the voice processor is electrically disconnected from the controller when the switch is in the second position, and the display is configured to provide at least one of: a first visual confirmation when the switch is in the first position, and a second visual confirmation when the switch is in the second position.

* * * * *